(12) United States Patent
Kondo et al.

(10) Patent No.: US 7,050,092 B2
(45) Date of Patent: May 23, 2006

(54) SIGNAL PROCESSING APPARATUS, SIGNAL PROCESSING METHOD, AND PRESENTATION SYSTEM

(75) Inventors: Tetsujiro Kondo, Tokyo (JP); Yuji Okumura, Kanagawa (JP); Tetsushi Kokubo, Chiba (JP); Daisuke Kikuchi, Tokyo (JP); Hideo Kasama, Kanagawa (JP)

(73) Assignee: Sony Corporation, Tokyo (JP)

( * ) Notice: Subject to any disclaimer, the term of this patent is extended or adjusted under 35 U.S.C. 154(b) by 979 days.

(21) Appl. No.: 09/908,908

(22) Filed: Jul. 19, 2001

(65) Prior Publication Data

US 2002/0089590 A1 Jul. 11, 2002

(30) Foreign Application Priority Data

Jul. 21, 2000 (JP) .................................... 2000-220925

(51) Int. Cl.
*H04N 5/228* (2006.01)

(52) U.S. Cl. .................. 348/208.99; 348/208.4

(58) Field of Classification Search ......... 348/121–124, 348/208.99, 208.2, 208.4, 208.7
See application file for complete search history.

(56) References Cited

U.S. PATENT DOCUMENTS

| | | | | | |
|---|---|---|---|---|---|
| 5,727,115 | A | * | 3/1998 | Wada | 386/113 |
| 5,729,290 | A | * | 3/1998 | Tokumitsu et al. | 348/349 |
| 5,865,624 | A | * | 2/1999 | Hayashigawa | 434/66 |
| 5,990,942 | A | * | 11/1999 | Ogino | 348/208.6 |
| 6,359,648 | B1 | * | 3/2002 | Fukasaka | 348/208.99 |
| 6,501,503 | B1 | * | 12/2002 | Kudo | 348/208.99 |
| 6,809,758 | B1 | * | 10/2004 | Jones | 348/208.99 |
| 2003/0095601 | A1 | | 5/2003 | Kondo et al. | |

* cited by examiner

*Primary Examiner*—Thai Tran
*Assistant Examiner*—Nelson D. Hernandez
(74) *Attorney, Agent, or Firm*—Frommer Lawrence & Haug LLP; William S. Frommer; Thomas F. Presson

(57) ABSTRACT

A unified signal encoder acquires a video signal stored in a video recorder, and a vibration signal stored in a vibration signal recorder. The unified signal encoder generates a unified signal based on the video signal and the vibration signal. A signal responsive to a plurality of sensory stimuli is thus transmitted together.

27 Claims, 20 Drawing Sheets

FRAME

SIGNAL PROCESSING APPARATUS, SIGNAL PROCESSING METHOD, AND PRESENTATION SYSTEM

BACKGROUND OF THE INVENTION

1. Field of the Invention

The present invention relates to method and apparatus for processing a signal, and a presentation system and, more specifically, to method and apparatus for handling signals of a plurality of sensory stimuli, and a presentation system employing the signal processing apparatus.

2. Description of the Related Art

There are widely available systems in which a transmitter transmits a video signal and an audio signal associated with the video signal, and a receiver receives, and decodes the video signal and the audio signal, and displays the video on a screen while outputting the audio signal.

The different types of signals, such as the video signal and the audio signal, are respectively transmitted and received. The processing of the video signal and the processing of the audio signal are performed separately.

When a transmitter transmits the video signal only, a receiver simply displays an image corresponding to the video signal. When the transmitter transmits the audio signal only, the receiver simply outputs the sound corresponding to the audio signal.

SUMMARY OF THE INVENTION

Accordingly, it is an object of the present invention to transmit signals corresponding to a plurality of sensor stimuli, such as a voice, vibration, and an image, and to present such sensing signals in an optimum manner in accordance with the sensory stimuli.

The present invention in an aspect relates to a signal processing apparatus and includes a first input unit for inputting first data representing first sensing, a second input unit for inputting second data representing second sensing, and a generator for generating unified data by unifying the first data and the second data.

The present invention in another aspect relates to a signal processing apparatus and relates to an input unit for inputting unified data including information of first sensing and second sensing, and a generator for generating first data representing the first sensing and second data representing the second sensing from the unified data.

The present invention in yet another aspect relates to a signal processing system and includes a first signal processing apparatus and a second signal processing apparatus. The first signal processing apparatus includes a first input unit for inputting first data representing first sensing, a second input unit for inputting second data representing second sensing, and a generator for generating unified data by unifying the first data and the second data. The second signal processing apparatus includes an input unit for inputting unified data including the information of first sensing and second sensing, and a generator for generating first data representing the first sensing and second data representing the second sensing from the unified data.

The present invention in still another aspect relates to a signal processing method and includes the steps of inputting first data representing first sensing, inputting second data representing second sensing, and generating unified data by unifying the first data and the second data.

The present invention in still another aspect relates to a signal processing method and includes the steps of inputting unified data including information of first sensing and second sensing, and generating first data representing the first sensing and second data representing the second sensing from the unified data.

The present invention in further aspect relates to a signal processing method and includes a first signal processing method and a second signal processing method. The first signal processing method includes the steps of inputting first data representing first sensing, inputting second data representing second sensing, and generating unified data by unifying the first data and the second data. The second signal processing method includes the steps of inputting unified data including the information of first sensing and second sensing, and generating first data representing the first sensing and second data representing the second sensing from the unified data.

The present invention in further aspect relates to a computer-readable storage medium storing a software program. The program includes program code for inputting first data representing first sensing, program code for inputting second data representing second sensing, and program code for generating unified data by unifying the first data and the second data.

The present invention in further aspect relates to a computer-readable storage medium storing a software program. The program includes program code for inputting unified data including information of first sensing and second sensing, program code for generating first data representing the first sensing and second data representing the second sensing from the unified data.

The present invention in further aspect relates to a computer-readable storage medium storing a software program. The program includes a first program and a second program. The first program includes program code for inputting first data representing first sensing, program code for inputting second data representing second sensing, and program code for generating unified data by unifying the first data and the second data. The second program includes program code for inputting unified data including the information of first sensing and second sensing, and program code for generating first data representing the first sensing and second data representing the second sensing from the unified data.

DESCRIPTION OF THE PREFERRED EMBODIMENTS

Figure 1:
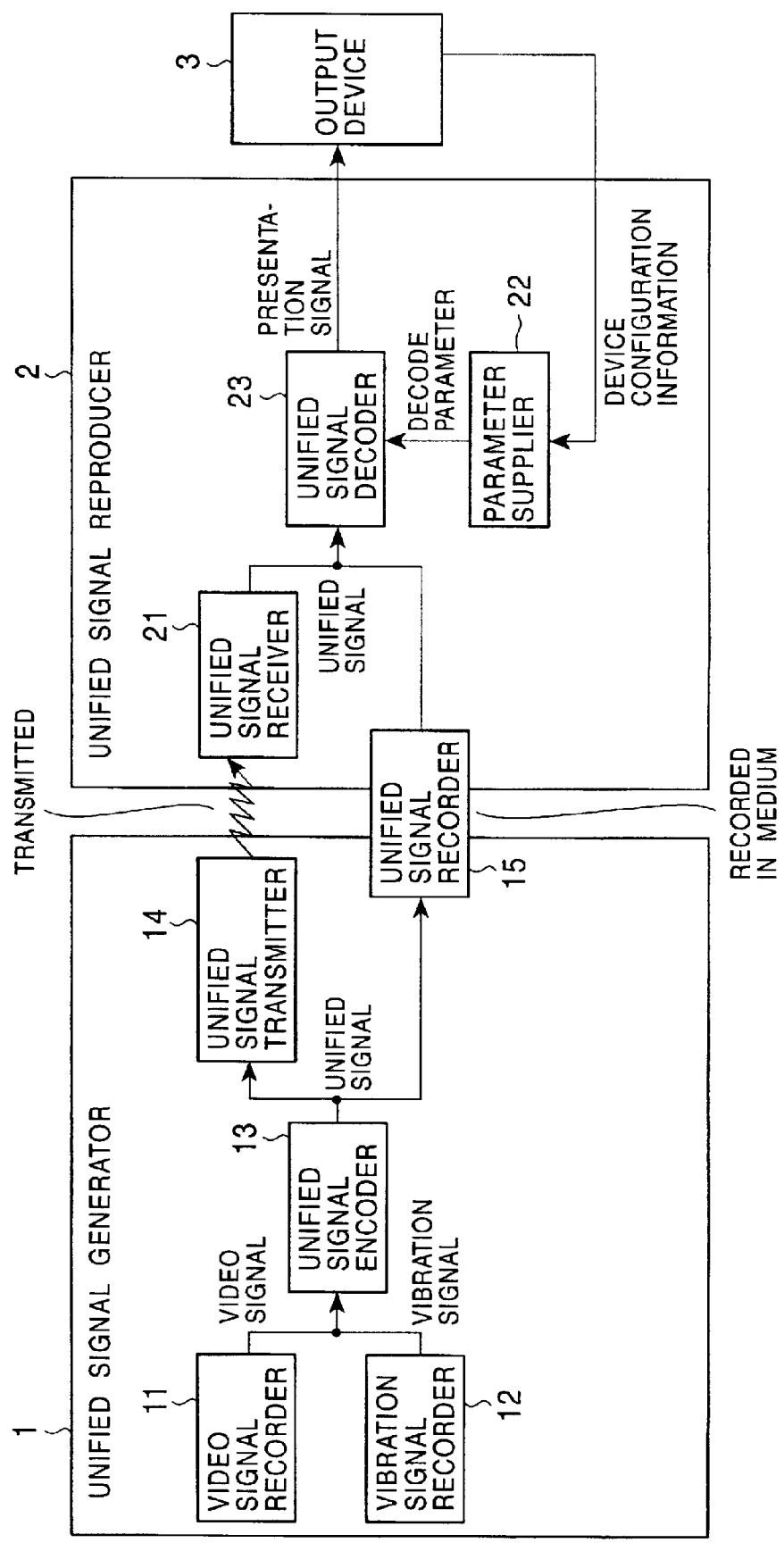
FIG. 1 is a block diagram showing one embodiment of a unified signal presentation system of the present invention.

FIG. 1 shows one embodiment of a unified signal presentation system of the present invention. A unified signal generator 1 generates a single unified signal representing a plurality of sensory stimuli such as an image and vibration (which rouse the senses of humans). The unified signal generator 1 transmits a generated unified signal to a unified signal reproducer 2 through a transmission line, such as a public telephone line, a network, or a satellite communications system.

The unified signal generator 1 records the generated unified signal onto a medium such as a magnetic tape, a magnetic disk, an optical disk, a magneto-optical disk, or a semiconductor memory. The medium having the unified signal stored therewithin is delivered to the unified signal reproducer 2 through a distribution system such as a home delivery service or a mail service.

The unified signal reproducer 2 generates a presentation signal indicating sensory stimuli such as an image and vibration, based on the unified signal fed through the transmission line or the medium from the unified signal generator 1, and feeds the generated presentation signal to an output device 3.

The output device 3 presents the plurality of sensory stimuli such as the image and vibration, based on the presentation signal supplied by the unified signal reproducer 2.

In this way, the user of the output device 3 recognizes the (presented) image and vibration.

The unified signal presentation system is now discussed, referring to the image and vibration as the sensory stimuli.

The unified signal generator 1 includes a video signal recorder 11, a vibration signal recorder 12, a unified signal encoder 13, a unified signal transmitter 14, and a unified signal recorder 15.

The video signal recorder 11 is composed a medium, such as a hard disk, and a medium drive, and records a video signal for a moving picture. The video signal can be a digital signal such as an MPEG (Moving Picture Experts Group), an MPEG 2, or an analog signal. In response to a request from the unified signal encoder 13, the video signal recorder 11 feeds the recorded video signal to the unified signal encoder 13.

The vibration signal recorder 12 records beforehand a vibration signal corresponding to the video signal recorded by the video signal recorder 11. The vibration signal represents a displacement of the body of the user in time and space. For example, the vibration signal represents a vertical motion or a rotation of the user body. The vibration signal recorder 12 is composed of a medium, such as a hard disk, and a medium drive, and feeds the vibration signal associated with the video signal in synchronization with the video signal supplied to the unified signal encoder 13 by the video signal recorder 11.

Figure 2:
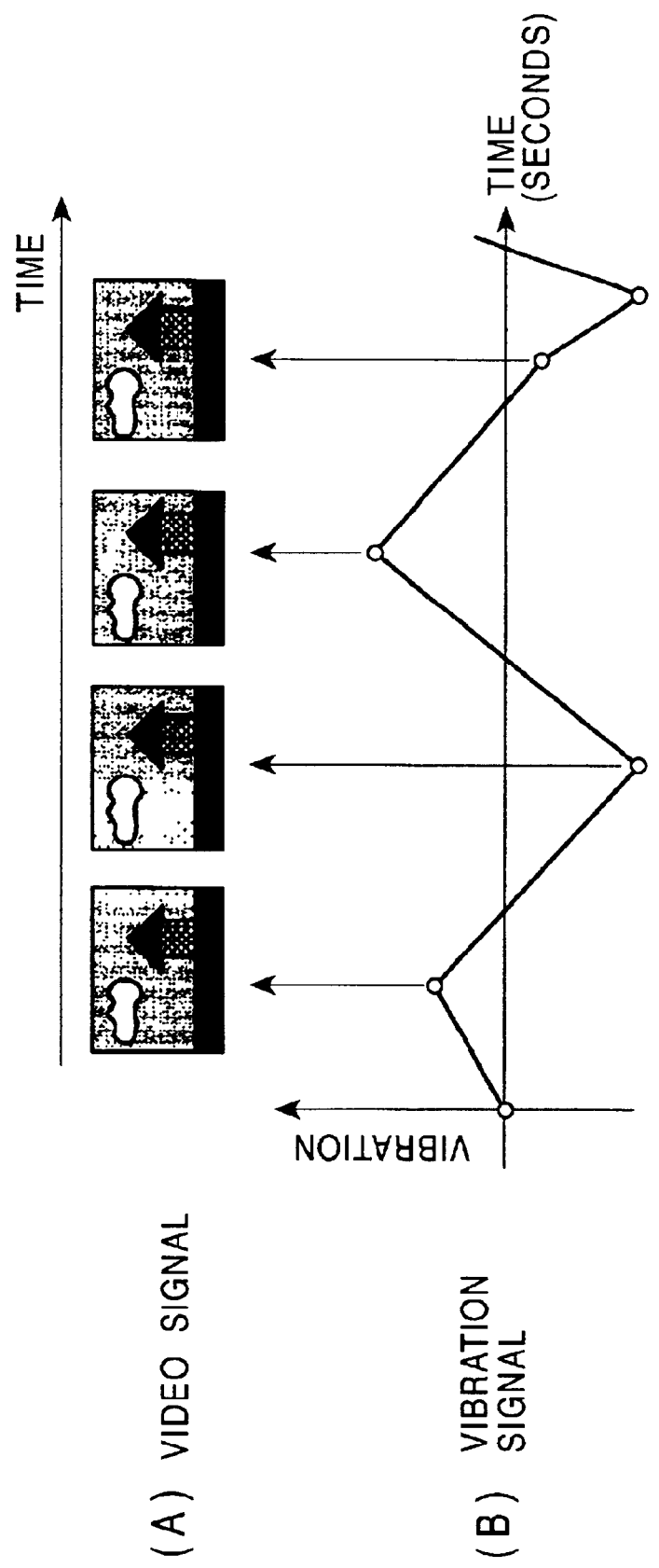
FIG. 2 shows a video signal and a vibration signal in the unified signal presentation system.

FIG. 2 shows the video signal supplied to the unified signal encoder 13 from the video signal recorder 11 and the vibration signal supplied to the unified signal encoder 13 from the vibration signal recorder 12.

A portion (A) of FIG. 2 shows the video signal supplied to the unified signal encoder 13 from the video signal recorder 11. A portion (B) of FIG. 2 shows the vibration signal, such as the one indicating a vertical motion of an image, supplied to the unified signal encoder 13 from the vibration signal recorder 12.

The video signal is associated with the vibration signal using time or a synchronization signal. The portions (A) and (B) of FIG. 2 respectively show an image represented by the video signal and a displacement of the vibration of the image represented by the vibration signal at any given time.

The unified signal encoder 13 generates a unified signal from the video signal supplied from the video signal recorder 11 and the vibration signal supplied from the vibration signal recorder 12.

Figure 3:
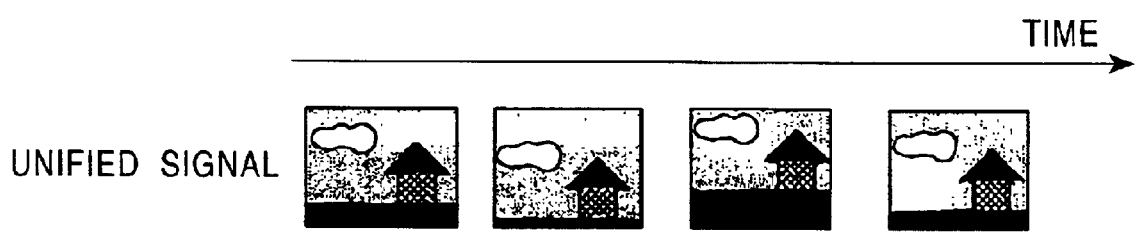
FIG. 3 shows a unified signal in the unified signal presentation system.

FIG. 3 shows the unified signal which is generated by the unified signal encoder 13 based on the video signal and the vibration signal shown in FIG. 2. The unified signal shown in FIG. 3 is generated by vertically shifting the image represented by the video signal in accordance with the vibration signal.

When the vibration signal represents a lateral vibration of the image, the image responsive to the video signal is laterally shifted in response to the vibration signal.

The image may be shifted in response to the vibration signal having other vibration components (such as of rolling, yawing, or pitching motions).

When an audio signal corresponding to the video signal contains engine sounds of an automobile, the unified signal encoder 13 may read a vibration signal of the automobile from the vibration signal recorder 12, and may generates a unified signal by shifting the image in accordance with the read vibration signal. In this case, the image corresponding to the unified signal contains the vibration of the automobile.

The unified signal encoder 13 may encode the unified signal according to an encoding system compatible with the format of the unified signal.

The unified signal encoder 13 feeds the generated unified signal to the unified signal transmitter 14 and the unified signal recorder 15.

The unified signal transmitter 14 transmits the unified signal, supplied by the unified signal encoder 13, to the unified signal reproducer 2 through a transmission line, such as a public telephone line, a network, or a satellite communications system.

The unified signal recorder 15 records the unified signal, supplied by the unified signal encoder 13, onto a medium such as a magnetic tape, a magnetic disk, an optical disk, a magneto-optical disk, or a semiconductor memory. The medium with the unified signal stored therewithin is delivered to the unified signal reproducer 2.

The unified signal reproducer 2 includes a unified signal receiver 21, a parameter supplier 22, and a unified signal decoder 23.

The unified signal receiver 21 receives the unified signal, transmitted by the unified signal generator 1, and feeds unified signal to the unified signal decoder 23.

The unified signal, read from a drive (unshown), is fed to the unified signal decoder 23.

The parameter supplier 22 receives device configuration information supplied from the output device 3, and then feeds a decode parameter, responsive to the device configuration information, to the unified signal decoder 23.

For example, the decode parameter is zero, when the output device 3 has no function of presenting vibration, and is one when the output device 3 has a function of presenting vibration.

The unified signal decoder 23 converts the unified signal into a presentation signal in accordance with a device configuration of the output device 3, based on the decode parameter supplied from the parameter supplier 22, and feeds the presentation signal to the output device 3.

The presentation signal output by the unified signal reproducer 2 may be a signal composed of the video signal and the vibration signal, or a signal composed of the video signal only.

Figure 4:
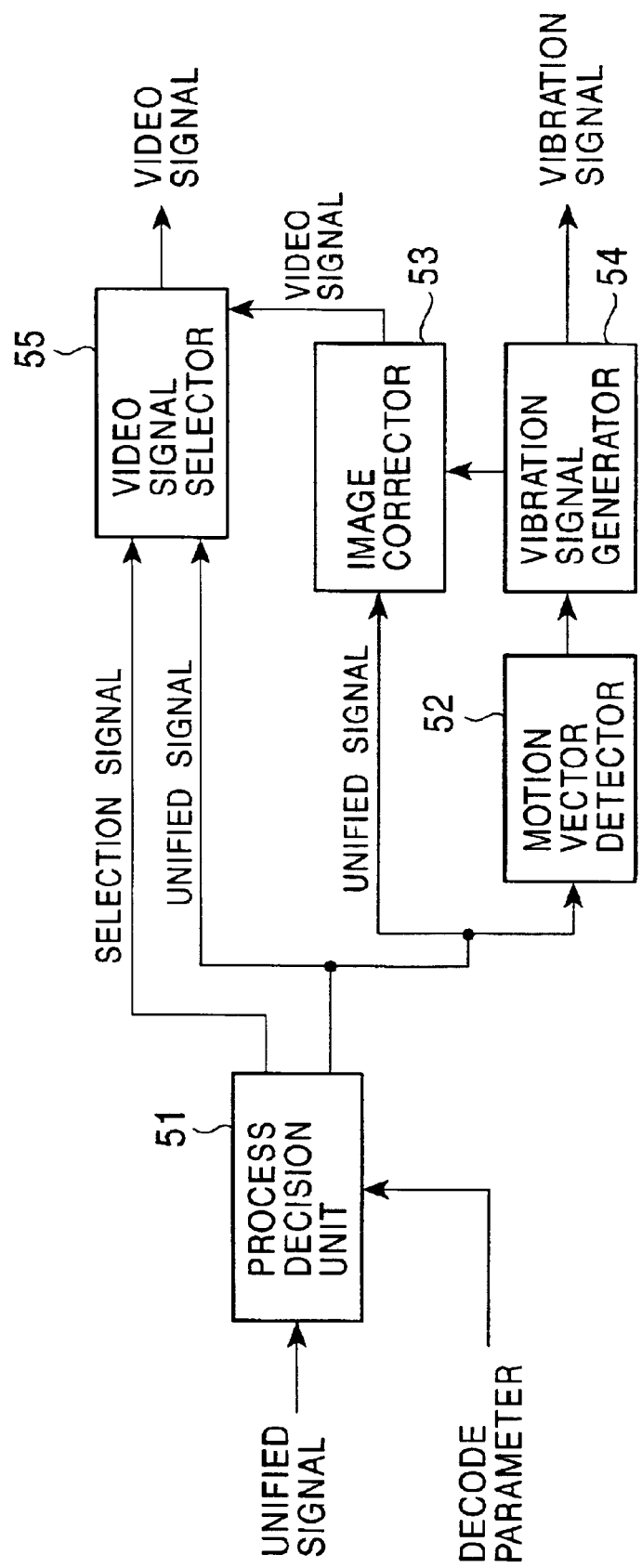
FIG. 4 is a block diagram showing a unified signal decoder 23.

FIG. 4 illustrates the construction of the unified signal decoder 23. The unified signal and the decode parameter input, input to the unified signal decoder 23, are fed to a process decision unit 51.

Based on the decode parameter from the parameter supplier 22, the process decision unit 51 decides whether the output presentation signal of the unified signal decoder 23 includes the video signal and the vibration or the video signal only.

Figure 10:
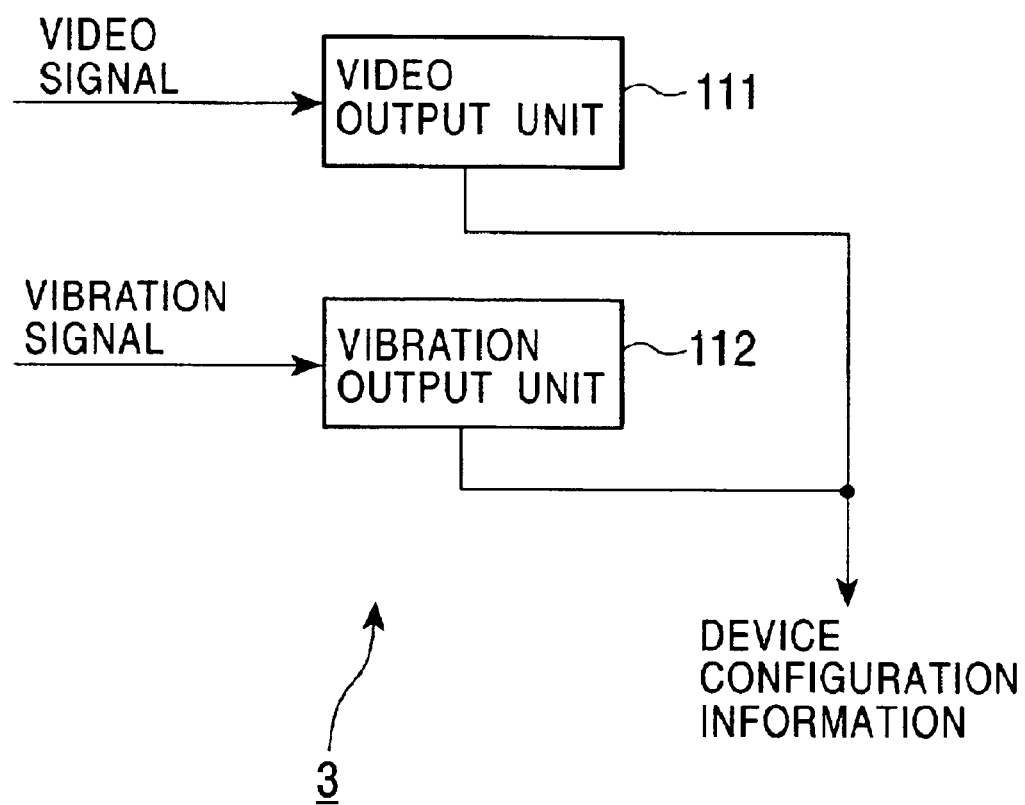
FIG. 10 shows the construction of an output device 3.

When the output device 3 includes a video output unit 111 and a vibration output unit 112 as shown in FIG. 10 as will be discussed later (i.e., the output device 3 has the function of presenting vibration), the process decision unit 51 outputs both the video signal and the vibration signal as the presentation signal.

Figure 14:
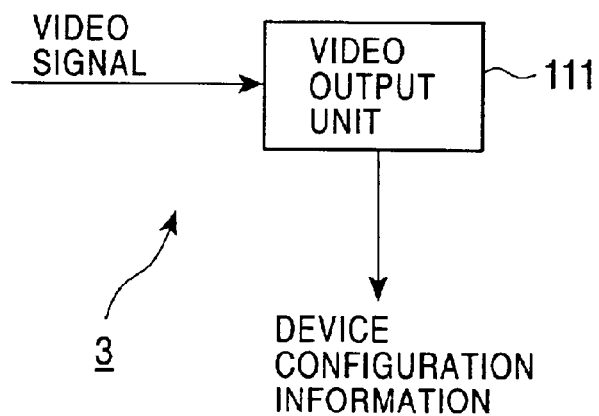
FIG. 14 shows another example of the output device 3.

When the output device 3 includes a video output unit 111 only as shown in FIG. 14 as will be discussed later (i.e., the output device 3 has no function of presenting vibration), the process decision unit 51 outputs the presentation signal as the video signal.

The process decision unit 51 feeds the input unified signal to a motion vector detector 52, a image corrector 53, and a video signal selector 55.

The motion vector detector 52 detects a motion vector from the image of the unified signal, and feeds the detected motion vector to a vibration signal generator 54.

Based on the supplied motion vector from the motion vector detector 52, the vibration signal generator 54 generates the vibration signal. The vibration signal generator 54 supplies the generated vibration signal to the image corrector 53 while outputting the generated vibration signal to the output device 3 as the output of the unified signal decoder 23.

Based on the vibration signal from the vibration signal generator 54, the image corrector 53 corrects the unified signal supplied from the process decision unit 51 to remove vibration of the image, and feeds the video signal containing the corrected image to the video signal selector 55.

The image corrector 53 corrects the image by shifting the image of the unified signal as the video signal in response to the vibration signal (by moving the image in a direction opposite to the direction in the unified signal encoder 13) when the vibration signal indicates a vertical vibration. In other words, the video signal output from the image corrector 53 becomes identical to the video signal recorded by the video signal recorder 11, and an image free from the vertical motion is thus displayed.

Based on the selection signal supplied from the process decision unit 51, the video signal selector 55 selects between the unified signal supplied from the process decision unit 51 and the video signal supplied from the image corrector 53, and outputs the selected signal to the output device 3 as the output of the unified signal decoder 23.

The video signal selector 55 selects the video signal supplied from the image corrector 53 when the output device 3 is composed of the video output unit 111 and the vibration output unit 112, and outputs the video signal of an image free from the vertical motion as the unified signal. When the output device 3 is composed of the video output unit 111 only, the video signal selector 55 selects the unified signal supplied from the process decision unit 51, and outputs it as the unified signal.

Figure 5:
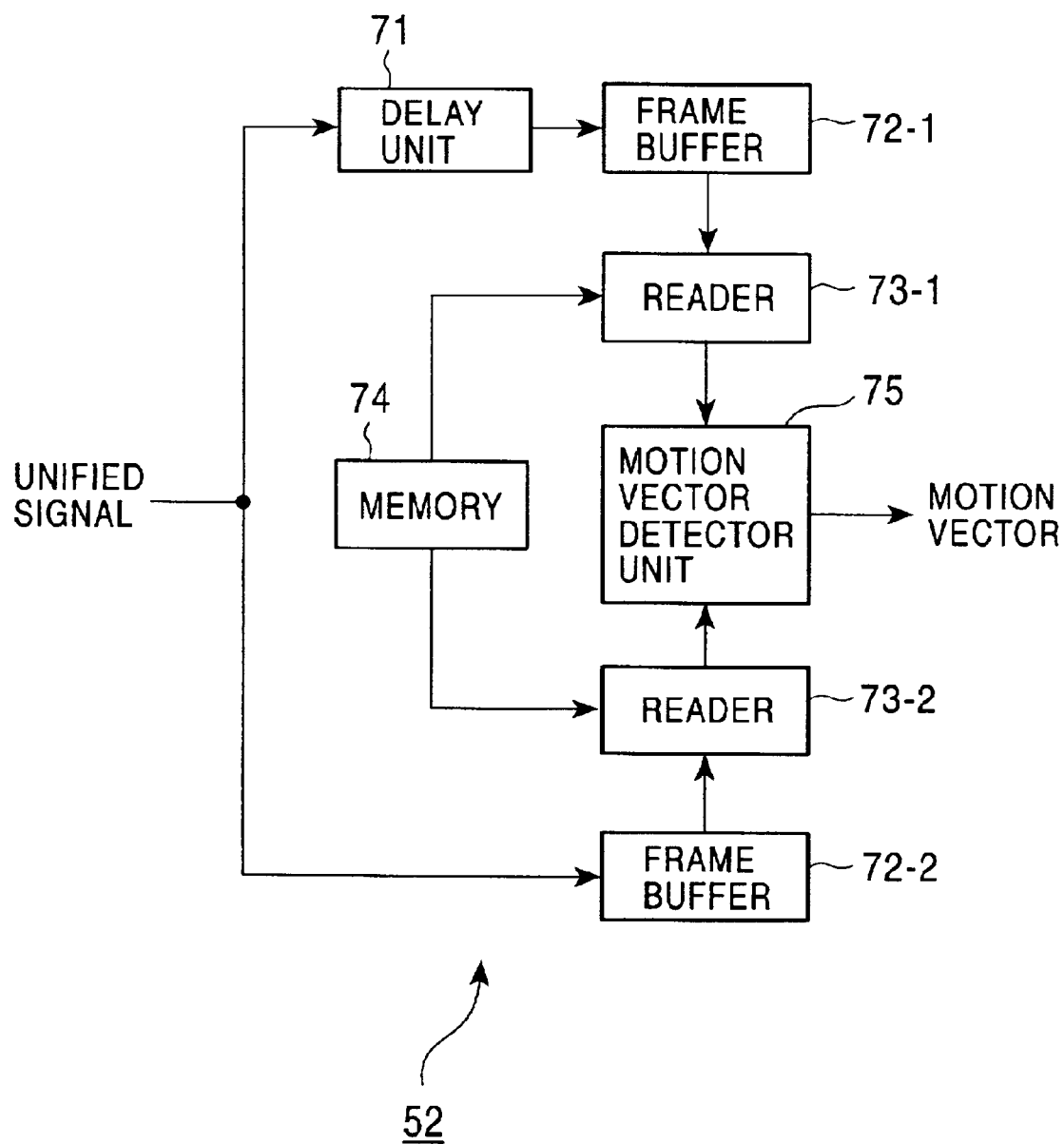
FIG. 5 is a block diagram showing a motion vector detector 52.

FIG. 5 is a block diagram showing the construction of the motion vector detector 52. The video signal input to the motion vector detector 52 is delayed by one frame through a delay unit 71, and is then supplied to a frame buffer 72-1. The video signal input to the motion vector detector 52 is also fed to a frame buffer 72-2.

Readers 73-1 and 73-2 respectively read the video signals from the frame buffers 72-1 and 72-3 in accordance with a predetermined pixel position pattern stored in a memory 74, and outputs the video signals to a motion detector unit 75.

The motion detector unit 75 detects a motion vector from the supplied video signal, and outputs the detected motion vectors to the vibration signal generator 54.

The motion vector detector 52 shown in FIG. 5 will now be discussed. At time t, the video signal input to the motion vector detector 52 is supplied to the delay unit 71 and the frame buffer 72-2. The frame buffer 72-2 stores the input video signal of one frame. Since the delay unit 71 delays the video signal by one frame, at time t the frame buffer 72-1 stores the video signal at time (t-1) (i.e., the video signal one frame earlier that time t).

The video signal at time (t-1) stored in the frame buffer 72-1 is read by the reader 73-1, and the video signal at time t stored in the frame buffer 72-2 is read by the reader 73-2.

The readers 73-1 and 73-2 respectively read the video signals, in accordance with the predetermined pixel position pattern, stored in the frame buffers 72-1 and 72-2. The pixel position pattern stored in the memory 74 will now be discussed, referring to FIG. 6.

Figure 6:
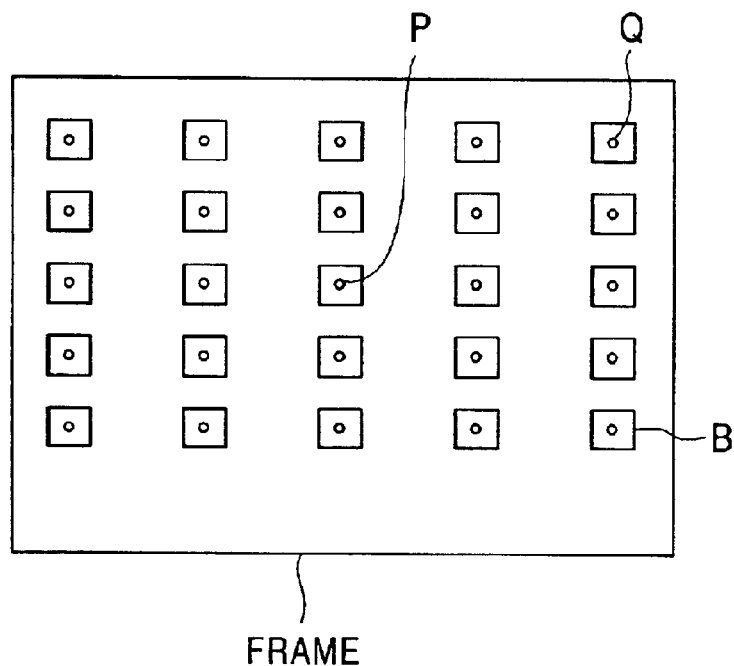
FIG. 6 shows a pattern stored in a memory 74.
Figure 7:
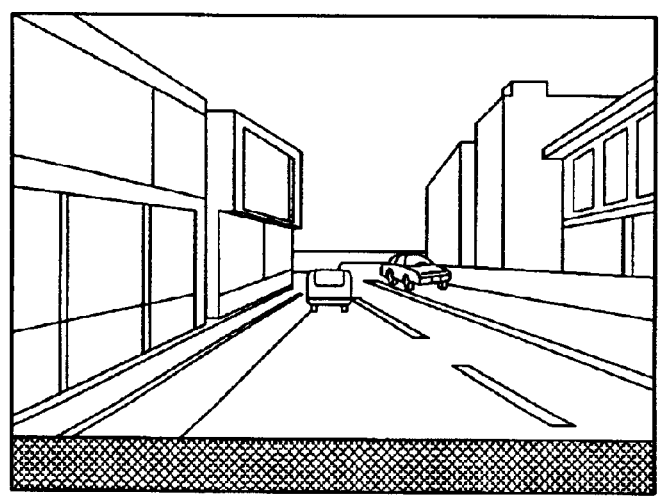
FIG. 7 shows one example of an image of the unified signal.

FIG. 6 shows one example of the pixel position pattern stored in the memory 74. Some of pixels constituting one frame are unrelated to vibration in the unified signal generated by the unified signal generator 1 as shown in FIG. 7, for example, a portion unrelated to an image appears in the lower area of the screen because the image is vertically shifted. A pixel centered on the screen area with the unrelated portion removed is now designated a convergence point P, and 25 points Q symmetrical with respect to a horizontal line running through the convergence point P and symmetrical with respect to a vertical line running through the convergence point P are set up (including the convergence point P). A motion vector is detected with respect to each representative point Q.

At time (t-1), a block B, composed of 33×33 pixels, is set up with respect to each representative point Q, and is referred to as a reference block. At time t, a block as large as 65×65 pixels is set up as a search block with respect to each representative point Q. Block matching is performed using the reference block and the search block to detect a motion vector for each representative point Q.

The memory 74 stores the pixel position pattern of video data required to perform block matching, such as position information of the representative point Q, and the sizes of the reference block, and the search block.

The reader 73-1 reads pixel data, out of the video signal at time (t-1) stored in the frame buffer 72-1, matching the above-described pixel position pattern stored in the memory 74, namely, reads pixel data of the block B, and outputs the data of the reference block to the motion detector unit 75. Similarly, the reader 73-2 reads pixel data, out of the video signal at time t stored in the frame buffer 72-2, matching the above-described pixel position pattern stored in the memory 74, and outputs the data of the search block to the motion detector unit 75.

Using the input reference block data and search block data, the motion detector unit 75 performs block matching, and detects a motion vector at each representative point Q. In this case, 25 motion vectors are detected.

The motion vector detector 52 detects the motion vectors and supplies the detected motion vectors to the vibration signal generator 54.

Figure 8:
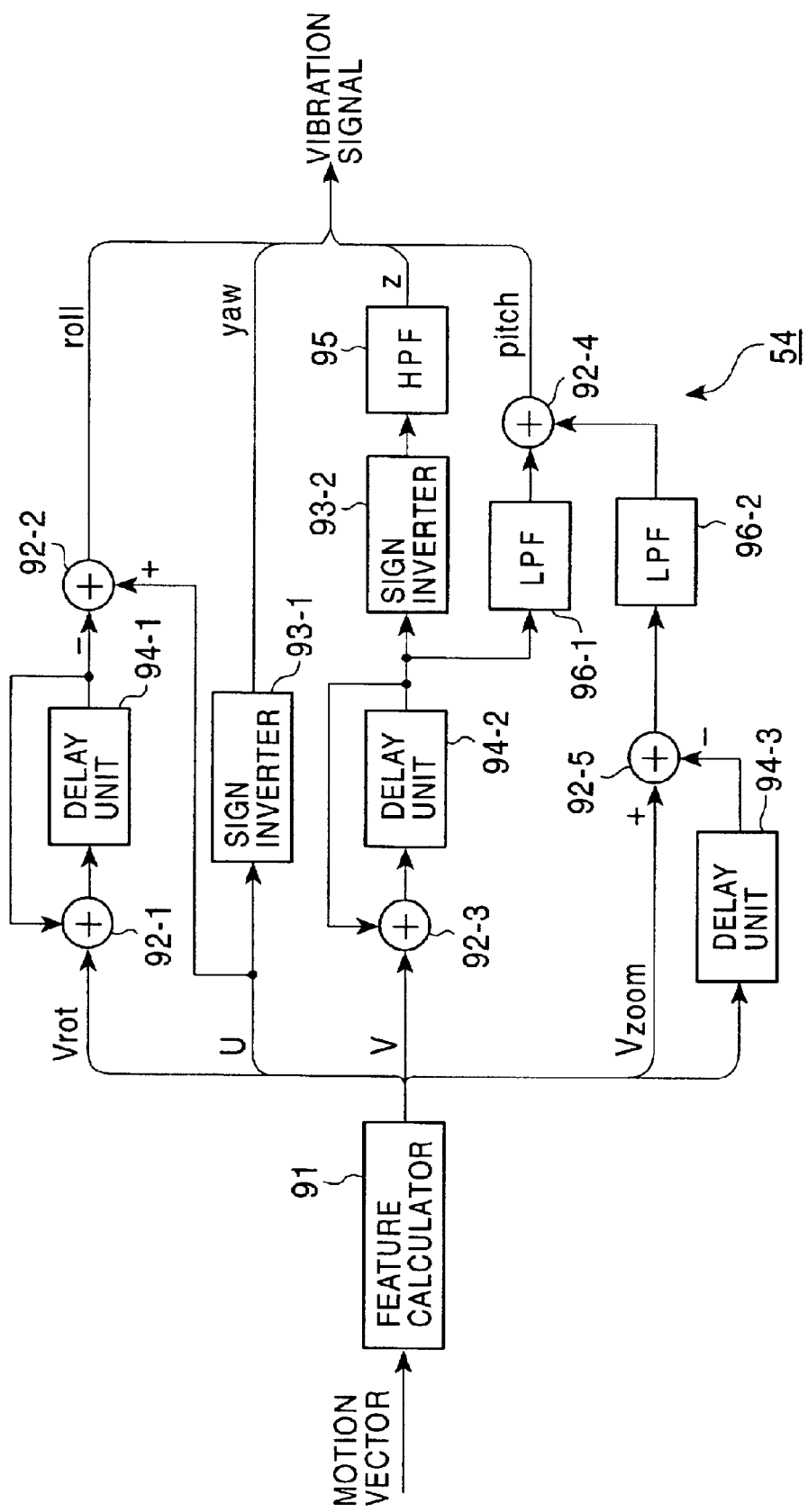
FIG. 8 is a block diagram showing the construction of a vibration signal generator 54.

FIG. 8 is a block diagram showing the vibration signal generator 54. A feature calculator 91 calculates a feature from the input motion vector. For more detail of the vibration signal generator 54, see copending U.S. patent application Ser. No. 09/488286 which is assigned to the same assignee as the present invention.

The feature calculator 91 calculates four components of the vibration of the image, i.e., a horizontal component u, a vertical component v, a zooming component $v_{zoom}$, and a rotational component $v_{rot}$ in accordance with the following equations.

Horizontal component $u = (1/n)\Sigma u_i$ (1)

Vertical component $v = (1/n)\Sigma v_i$ (2)

Zooming component $v_{zoom} = (1/n)\Sigma v_{zoomi}/d_i$ (3)

Rotational component $v_{rot} = (1/n)\Sigma v_{roti}/d_i$ (4)

where a suffix i represents a number suffixed to Q, and ranges from 1 to 25 here, and n represents the number of representative points and is 25 here. The values resulting from the equations (1) through (4) are respective averages of the components u, v, $v_{zoom}$, and $v_{rot}$ of the 25 motion vectors.

Figure 9:
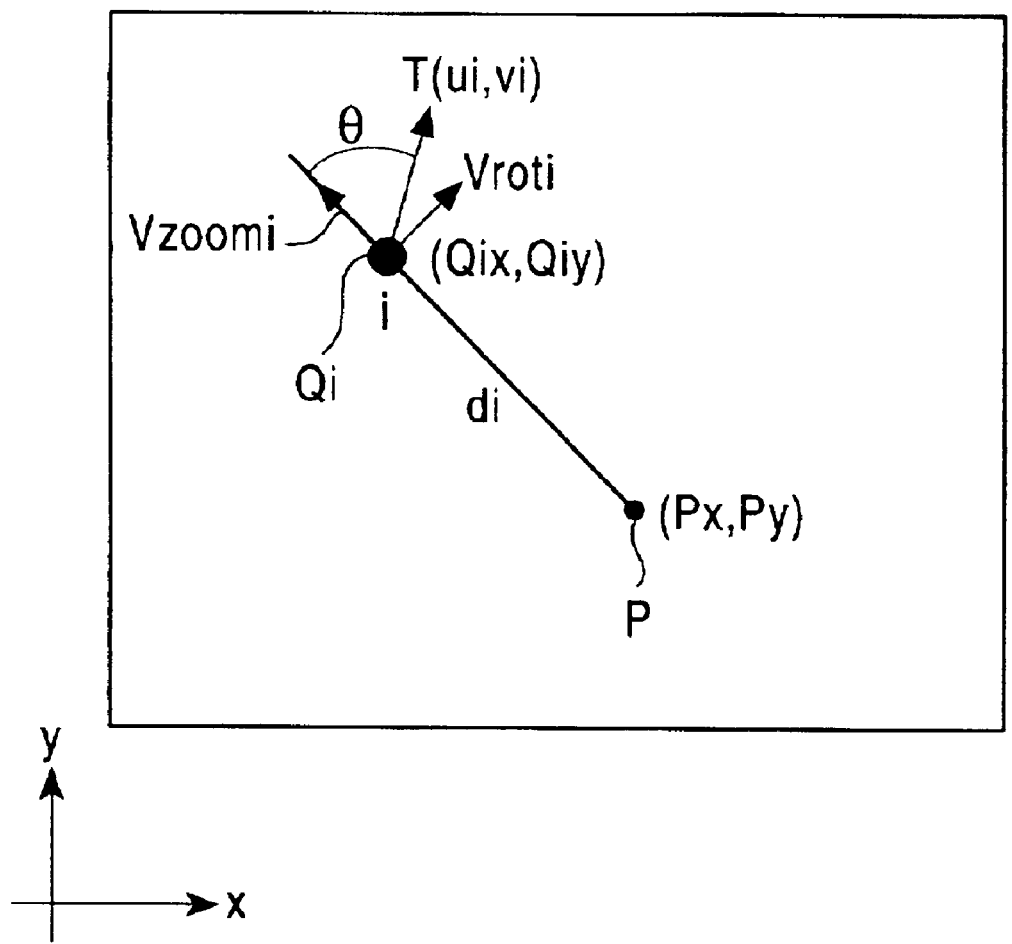
FIG. 9 shows the relationship of components u, v, $v_{zoom}$, and $V_{rot}$ of a motion vector.

Referring to FIG. 9, the relationship of the components u, v, $v_{zoom}$, and $v_{rot}$ will now be discussed. Let $u_i$ represent the horizontal component of the motion vector T, and $v_i$ represent the vertical component of the motion vector T of the representative point $Q_i$ to be processed here, $d_i$ represent a scalar quantity representing the distance between the convergence point P to the representative point $Q_i$, and (Px, Py) represents the coordinates of the convergence point P. The distance to coordinates ($Q_i x$, $Q_i y$) of the representative point $Q_i$ referenced to the coordinates (Px, Py) is calculated.

The components ($u_i$, $v_i$) of the motion vector T is referenced to the representative point $Q_i$ as the origin. The component of the motion vector T in a direction parallel to a line connecting the convergence point P to the representative point $Q_i$ is represented by $v_{zoomi}$, and the component of the motion vector T in a direction perpendicular to the line connecting the convergence point P to the representative point $Q_i$ is represented by $v_{roti}$. Let θ represent an angle made between the line connecting the convergence point P to the representative point $Q_i$ and the motion vector T. The components $v_{zoomi}$ and $v_{roti}$ are determined from the following equations.

$$v_{zoomi} = (u_i^2 + v_i^2)^{(1/2)} \cos\theta \quad (5)$$

$$v_{roti} = (u_i^2 + v_i^2)^{(1/2)} \sin\theta \quad (6)$$

The feature calculator 91 calculates the four components u, v, $v_{zoom}$, and $v_{rot}$ as feature quantities from the motion vectors output from the motion vector detector 52, using the equations (1) through (4). Data of the four components u, v, $v_{zoom}$, and $v_{rot}$ thus calculated is fed to the succeeding stages of the vibration signal generator 54.

To allow the user to feel like he drives an automobile, consideration is given to what type of vibration needs to be exerted to a seat the user is sitting on. When an automobile runs upward on a sloping road, the automobile is inclined upwardly. When the automobile is running on a bumpy road, the automobile is subject to vibrations from the road. When the automobile is running on a road that is transversely inclined from the horizontal, the automobile is also inclined accordingly.

These vibrations are stimuli acting on the automobile having sensors that generate vibration signals. The vibrations identical to the actual stimuli may be exerted on the seat on which the user sits to monitor the image. For example, if a stimulus is an inclination to the right, the seat of the user is also inclined to the right. The actual vibration may be exerted on the seat of the user using actuators.

Forces corresponding to a centrifugal force that works on the user when the automobile runs on a curved road, inertia working on the user when the automobile accelerates or decelerates, and forces acting on the user in response to the yawing of the automobile when the automobile turns left or right cannot be simulated, because it is impossible to artificially exert gravity to the user. An alternative vibration (an alternative stimulus) needs to be applied on the user. For example, to express inertia at the time of acceleration, an alternative stimulus of inclining the seat backward is applied to the user, because it is impossible to exert inertia on the user by moving the seat at acceleration.

Vibrations as the actual stimulus and the alternative stimulus, components of the vibration signal applied to the seat of the user, and the four components calculated by the feature calculator 91 are related as follows:

| Components expressed | Vibration signal component | Relationship the four components |
|---|---|---|
| Actual stimuli | | |
| Inclination of fore-aft line of road | Pitch | Low frequency components of $\Sigma v$ |
| Vibration from road | z | High frequency components of $-\Sigma v$ |
| Transverse inclination | Roll | $-\Sigma v_{rot}$ |

-continued

| Components expressed | Vibration signal component | Relationship the four components |
|---|---|---|
| Alternative stimuli | | |
| Centrifugal force when turning | Roll | u |
| Centrifugal force during acceleration/ deceleration | Pitch | Low frequency component of $dv_{zoom}/dt$ |
| Yawing of car when turning | Yaw | −u |

The succeeding stages of the vibration signal generator 54 generate the vibration signal to be fed to the output device 3 using the above listed relationship. The vibration signal produced by the vibration signal generator 54 corresponds to the vibration signal fed to the vibration signal recorder 12.

Out of the four components output from the feature calculator 91, the rotational component $v_{rot}$ is fed to an adder 92-1, the horizontal component u is fed to an adder 92-2 and a sign inverter 93-1, the vertical component v is fed to an adder 92-3, the zooming component $v_{zoom}$ is fed to an adder 92-5 and a delay unit 94-3. The output of the adder 92-1 is delayed through the delay unit 94-1 by one clock, and the delayed signal is fed to the adder 92-1. Similarly, the output of the adder 92-3 is delayed through a delay unit 94-2 by one clock and the delayed signal is fed to the adder 92-3.

The output of the delay unit 94-1 is supplied to the adder 92-2. The output data from the delay unit 94-2 is fed to an HPF (High-Pass Filter) 95 through a sign inverter 93-2, while being fed to an LPF (Low-Pass Filter) 96-1 through the adder 92-4. The zooming component $v_{zoom}$ input to the adder 92-5 is subtracted from the zooming component $v_{zoom}$ delayed through the delay unit 94-3 by one clock, and the subtracted zooming component $v_{zoom}$ is fed to the adder 92-4 through an LPF 96-2.

The calculation of the vibration signal components of rolling, yawing, z and pitching performed by the succeeding stages of the vibration signal generator 54 will now be discussed. The rotational component $v_{rot}$ is fed to the adder 92-1 in the succeeding stages of the vibration signal generator 54. At time t, the adder 92-1 adds the input rotational component $v_{rot}$ input at time t and the output data of the delay unit 94-1 at time (t-1) unit time earlier than time t. The adder 92-1 cumulatively adds (integrates) the rotational component $v_{rot}$, thereby calculating the vibration signal component of rolling $\Sigma v_{rot}$, which represents the transverse inclination of the road. Since the transverse inclination of rolling is $-\Sigma v_{rot}$, the adder 92-2 uses an inverted version of the output of the delay unit 94-1 in the addition operation thereof.

The vibration signal component of rolling (the horizontal component u) is used to express the centrifugal force that acts on the user when the automobile runs in a curved road. The adder 92-2 adds the inverted version of the output data of the delay unit 94-1 and the horizontal component u (i.e., subtracts the horizontal component u from the output of the delay unit 94-1), thereby calculating the vibration signal component of rolling to be supplied to the output device 3.

The vibration signal component of yawing representing the yawing motion when the automobile turns is obtained by inverting the horizontal component u. The vibration signal generator 54 thus calculates the vibration signal component of yawing by inverting the sign of the horizontal component u through the sign inverter 93-1.

The adder 92-3 adds the vertical component v input at time t and the vertical component v at time (t-1) one unit timer earlier than time t output by the delay unit 94-2. The adder 92-3 cumulatively adds (integrates) the vertical component v. The data, cumulatively added through the adder 92-3 and the delay unit 94-2, is input to the sign inverter 93-2 for sign inversion. The high frequency component only of the data is output from the HPF 95. In this way, the vibration signal z representing the vibration, to which the automobile is subject, is calculated.

The output data from the delay unit 94-2 is also output to the LPF 96-1, which picks up a low frequency component of the output data. The vibration signal component of pitching, representing the fore-aft inclination of the road, is thus calculated. The vibration signal component of pitching is also used as a vibration signal component representing inertia arising from acceleration and deceleration. For this reason, the vibration signal component of pitching, output from the LPF 96-1, is added to the vibration signal component of pitching representing inertia through the adder 92-4.

The vibration signal component of pitching representing inertia is derived from the zooming component $v_{zoom}$ input to the vibration signal generator 54. The zooming component $v_{zoom}$ input to the vibration signal generator 54 is fed to the adder 92-5 and the delay unit 94-3. The adder 92-5 receives the zooming component $v_{zoom}$t input at time t and the zooming component $v_{zoom}$(t-1) at time (t-1), delayed by the delay unit 94-3 by one unit time. The adder 92-5 differentiates the zooming component $v_{zoom}$ by subtracting the zooming component $v_{zoom}$(t-1) at time (t-1) from the zooming component $v_{zoom}$t input at time t. The LPF 96-2 extracts a low frequency component from the output of the adder 92-5, thereby resulting in the vibration signal component of pitching representing the inertia during acceleration and deceleration.

The adder 92-4 adds the output of the LPF 96-1 and the output of the LPF 96-2, thereby calculating the vibration signal component of pitching to be supplied to the output device 3.

FIG. 10 shows the construction of the output device 3. The output device 3 is composed of the video output unit 111 and the vibration output unit 112.

The video output unit 111, formed of a CRT (Cathode-Ray Tube), a liquid-crystal display, a screen, or a projector, presents an image responsive to the input video signal. The vibration output unit 112 outputs vibration responsive to the vibration signal.

The video output unit 111 and the vibration output unit 112 output device configuration information, indicating that the output device 3 includes the video output unit 111 and the vibration output unit 112.

Figure 11:
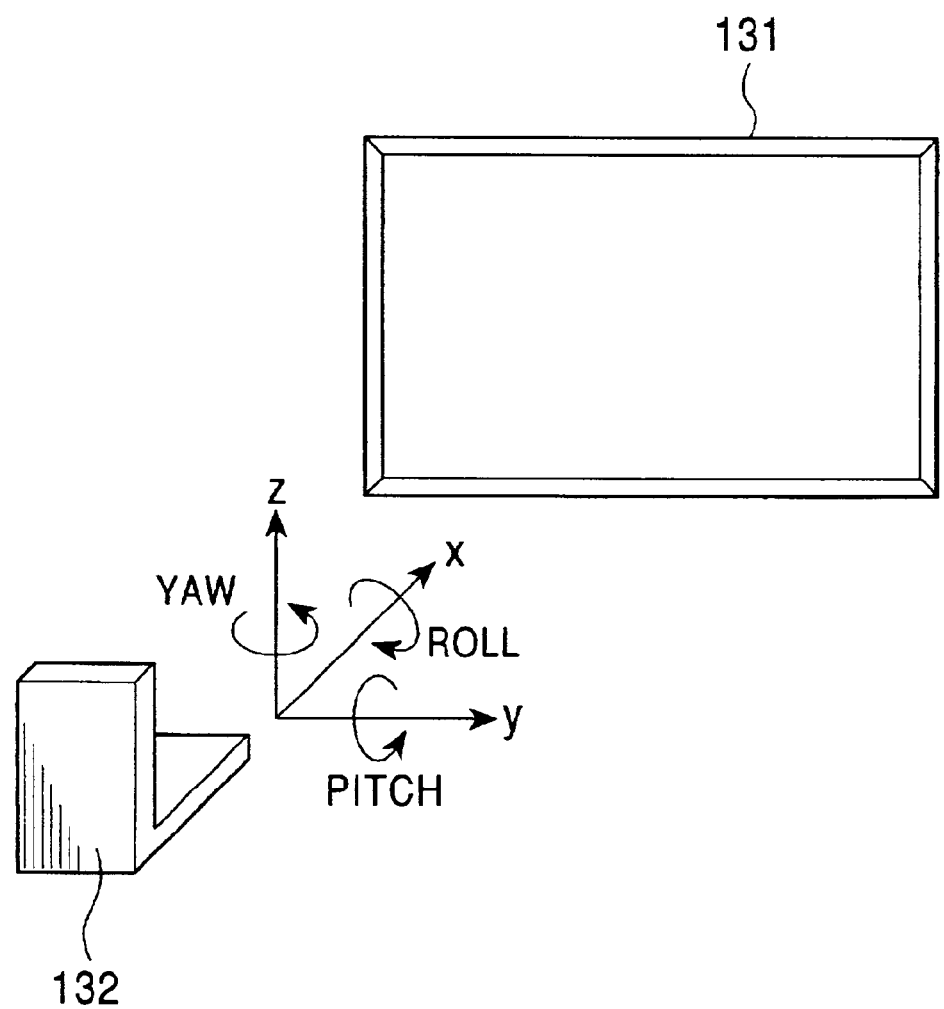
FIG. 11 shows the relationship between a screen 131 of a video output unit 111 and a seat 132 of a vibration output unit 112.

FIG. 11 shows the relationship between a screen 131 (to which an unshown projector projects an image) constituting the video output unit 111, and a seat 132 constituting the vibration output unit 112.

The video output unit 111 presents, on the screen 131, an image responsive to the video signal. In response to the vibration signal, the vibration output unit 112 vibrates the seat 132 to allow the user sitting on the seat 132 to feel the vibration.

As already discussed, the vibration is composed of rotational components about the three axes X, Y, and Z (rolling, pitching, and yawing), and translation components (x, y, and z) in the three axes.

Figure 12:
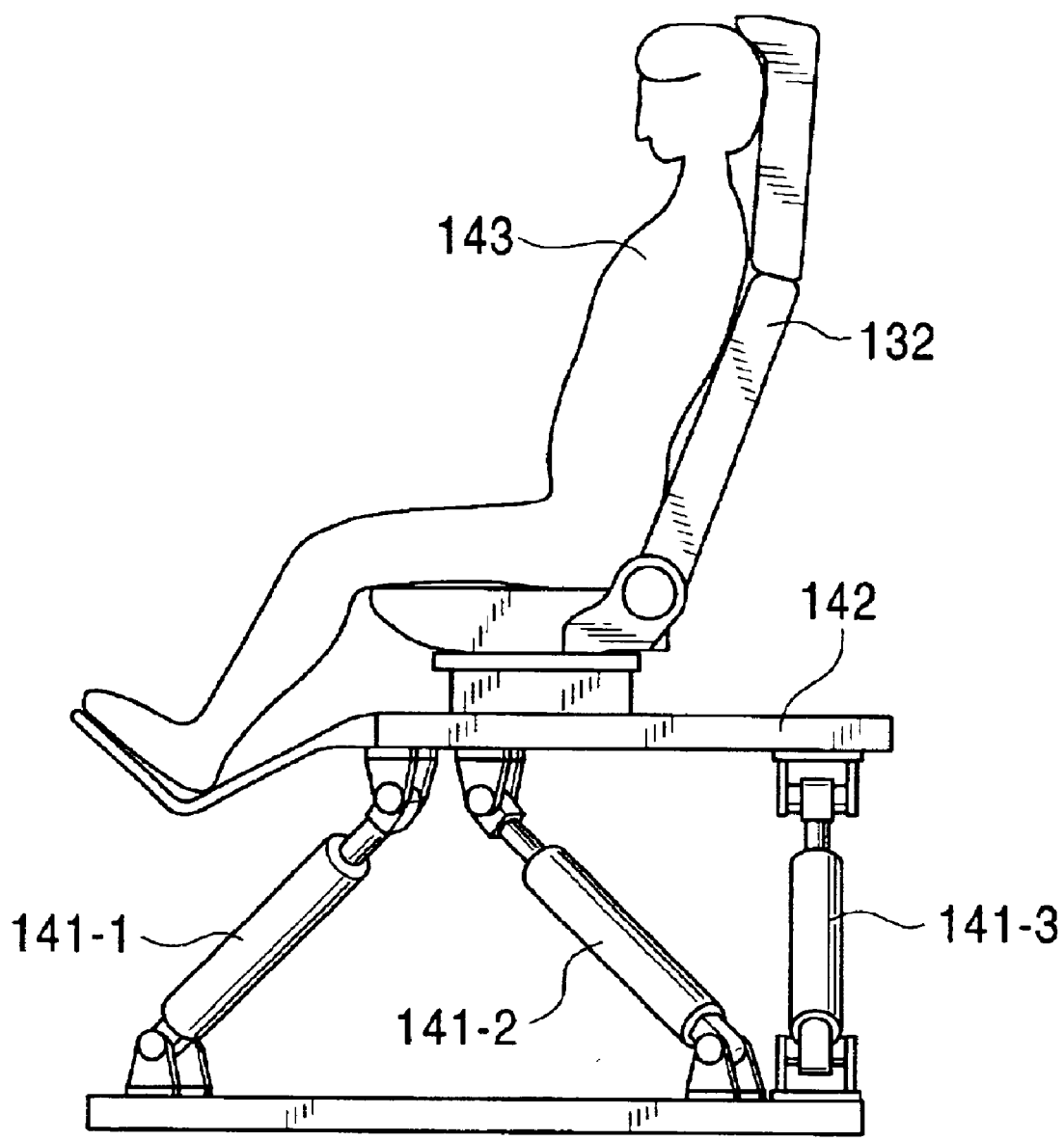
FIG. 12 shows the vibration output unit 112.
Figure 13:
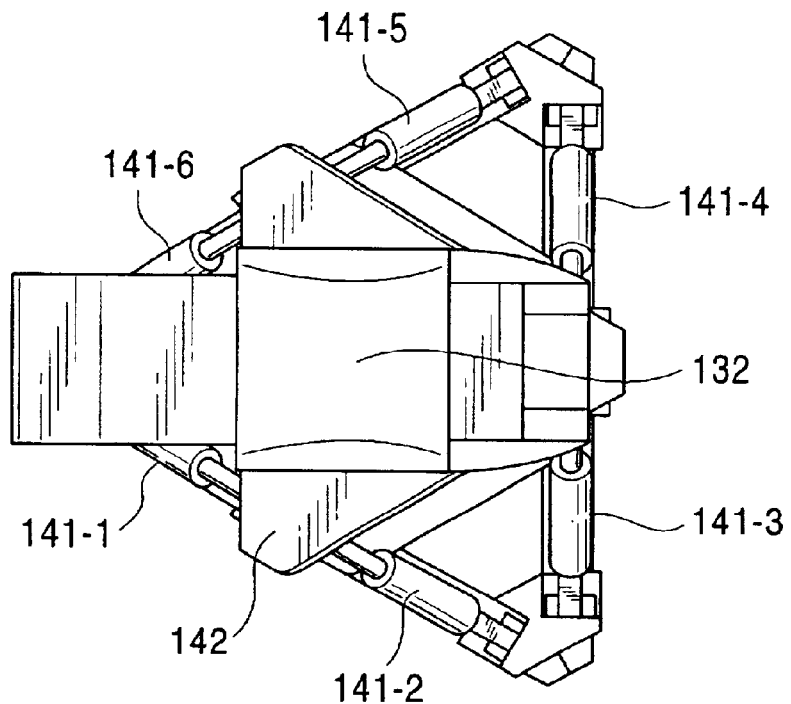
FIG. 13 shows the construction of the vibration output unit 112.

The construction of the vibration output unit 112 is shown in FIG. 12 and FIG. 13. FIG. 12 is a side view of the vibration output unit 112, and FIG. 13 is a top view of the vibration output unit 112. The vibration output unit 112 includes six pistons 141-1 through 141-6, and a mount 142 is supported by the six pistons 141-1 through 141-6. The seat 132 is secured to the mount 142, and the user 143 sits on the seat 132.

The pistons 141-1 through 141-6, formed of air cylinders or hydraulic cylinders, are moved along the center lines thereof. With the pistons 141-1 through 141-6 moved, the mount 142 vibrates, thereby vibrating the seat 132 affixed to the mount 142. A signal for controlling the pistons 141-1 through 141-6 is supplied from the unified signal reproducer 2.

FIG. 14 shows the construction of another output device 3. The output device 3 shown in FIG. 14 includes the video output unit 111 and includes no vibration output unit 112. The video output unit 111 outputs the device configuration information indicating that the output device 3 includes the video output unit 111 only.

Figure 15:
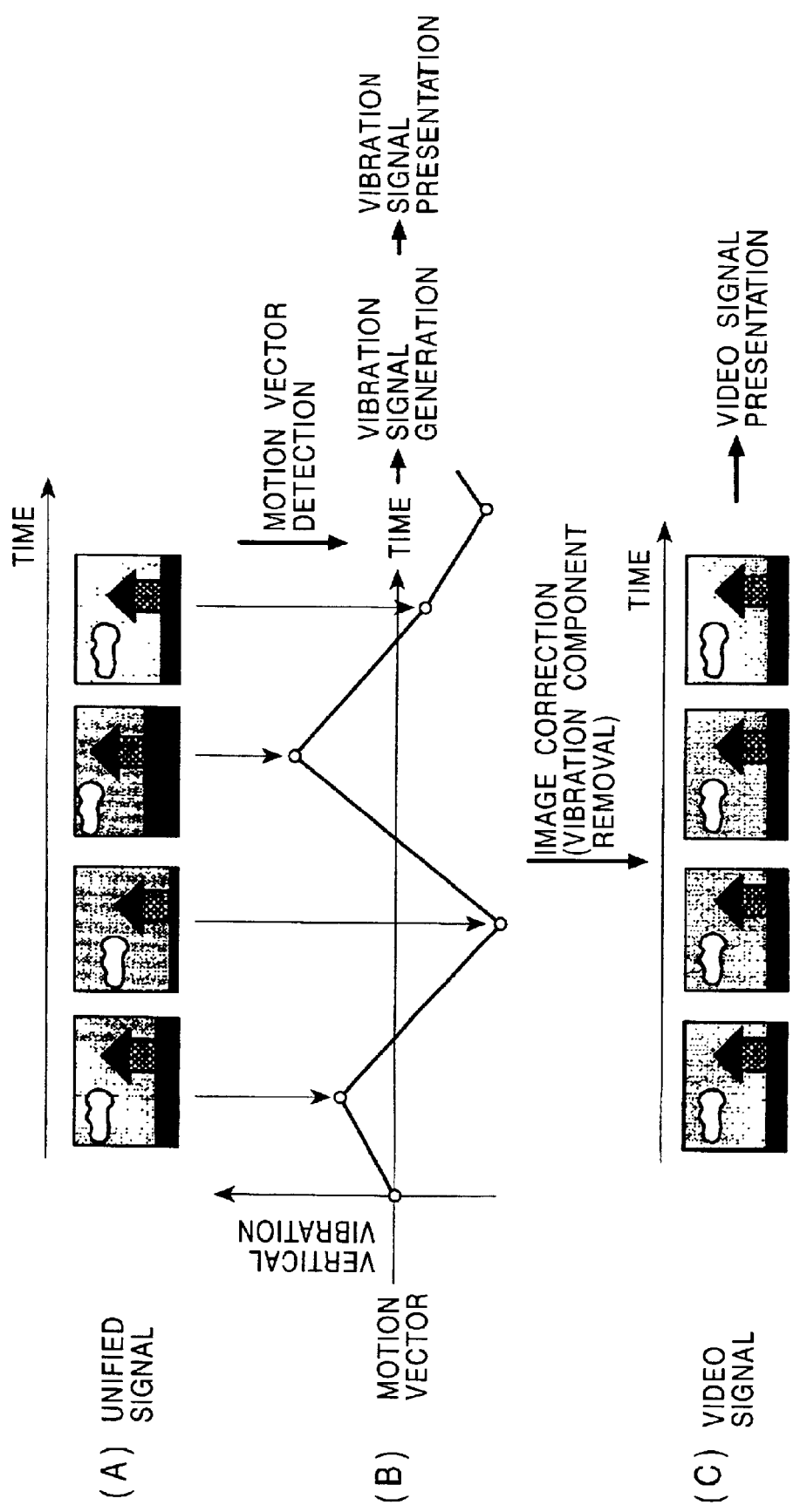
FIG. 15 shows a presentation signal output by the unified signal reproducer 2.

FIG. 15 shows the presentation signal output from the unified signal reproducer 2.

When the output device 3 includes the vibration output unit 112, the unified signal reproducer 2, receiving the unified signal shown in a portion (A) of FIG. 15, generates the vibration signal from the unified signal as shown in a portion (B) of FIG. 15 and outputs the vibration signal as the unified signal to the output device 3. Referring to a portion (C) of FIG. 15, the image responsive to the unified signal as the video signal is corrected (with the vibration component removed), and outputs the video signal of the corrected image to the output device 3 as the presentation signal.

Figure 16:
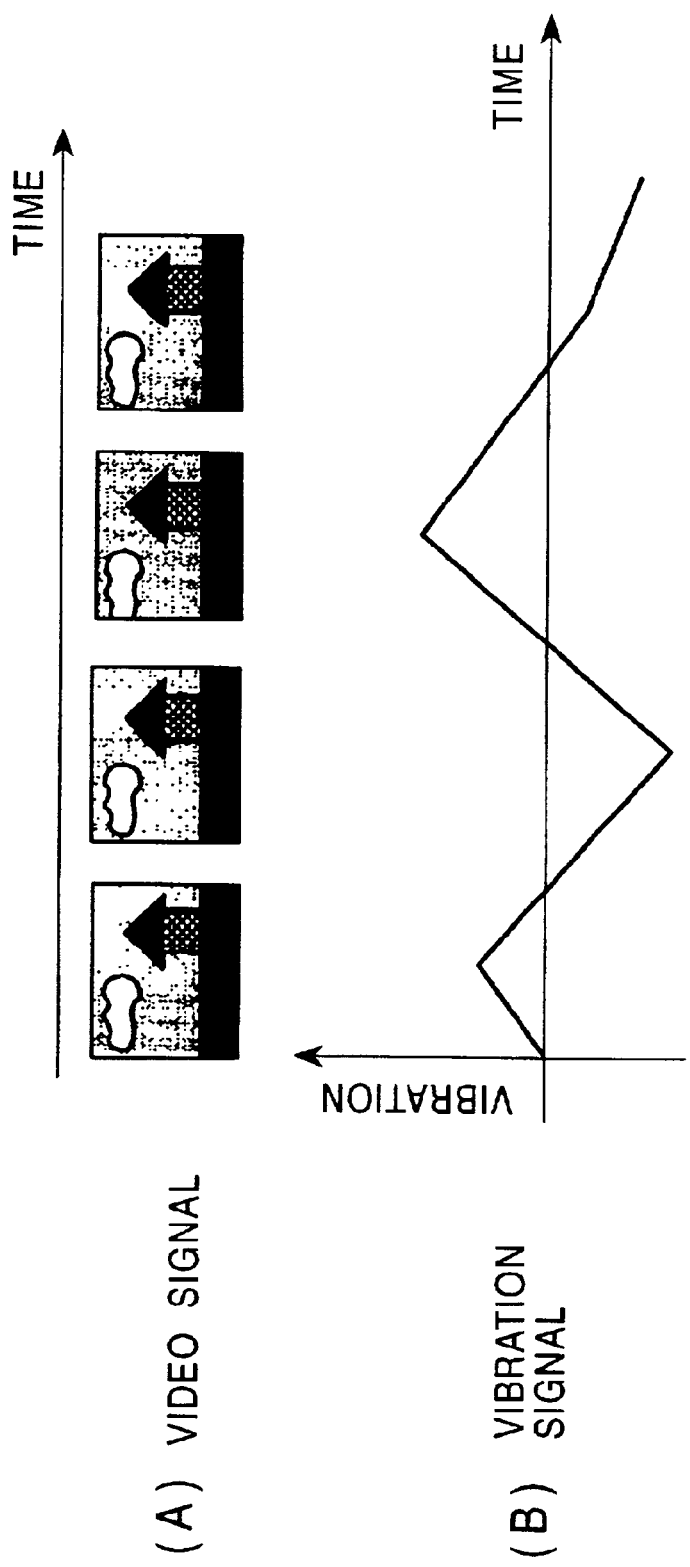
FIG. 16 shows a presentation signal output by the unified signal reproducer 2.

When the output device 3 has the vibration output unit 112, the unified signal supplied from the unified signal reproducer 2 to the output device 3 is composed of the video signal and the vibration signal as shown in FIG. 16. Referring to the portion (A) of FIG. 16, the video signal is corrected with the vibration component removed. The vibration signal shown in a portion (B) of FIG. 16 is formed of the unified signal and is associated with the video signal.

Figure 17:
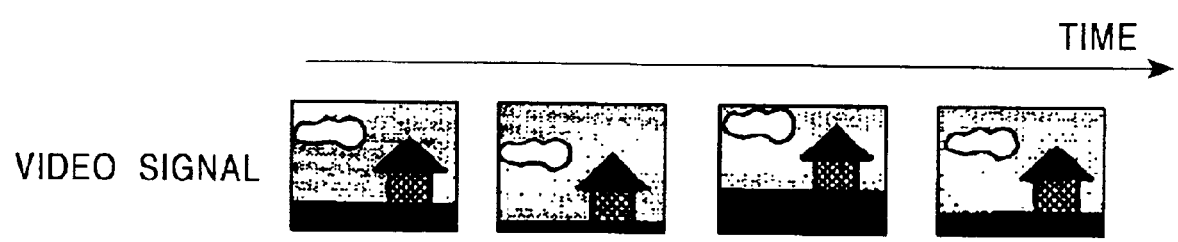
FIG. 17 shows a presentation signal output by the unified signal reproducer 2.

When the output device 3 has no vibration output unit 112, the unified signal supplied from the unified signal reproducer 2 to the output device 3 is formed of the video signal only and contains no vibration signal as shown in FIG. 17. The unified signal containing the vibration signal is output to the output device 3 as the video signal. In other words, the unified signal is fed to the output device 3 as the video signal with the image thereof uncorrected. The user of the unified signal reproducer 2 and the output device 3 visually observes the vibration of the image when the output device 3 has no vibration output unit 112. When the output device includes the vibration output unit 112, the user feels the vibration in response to the vibration stimulus on the vibration output unit 112 with the image free from vibration.

Even if the unified signal reproducer 2 receives the same unified signal, the unified signal reproducer 2 provides the video signal or the vibration signal presenting an optimum stimulus, in response to the device configuration of the output device 3.

Figure 18:
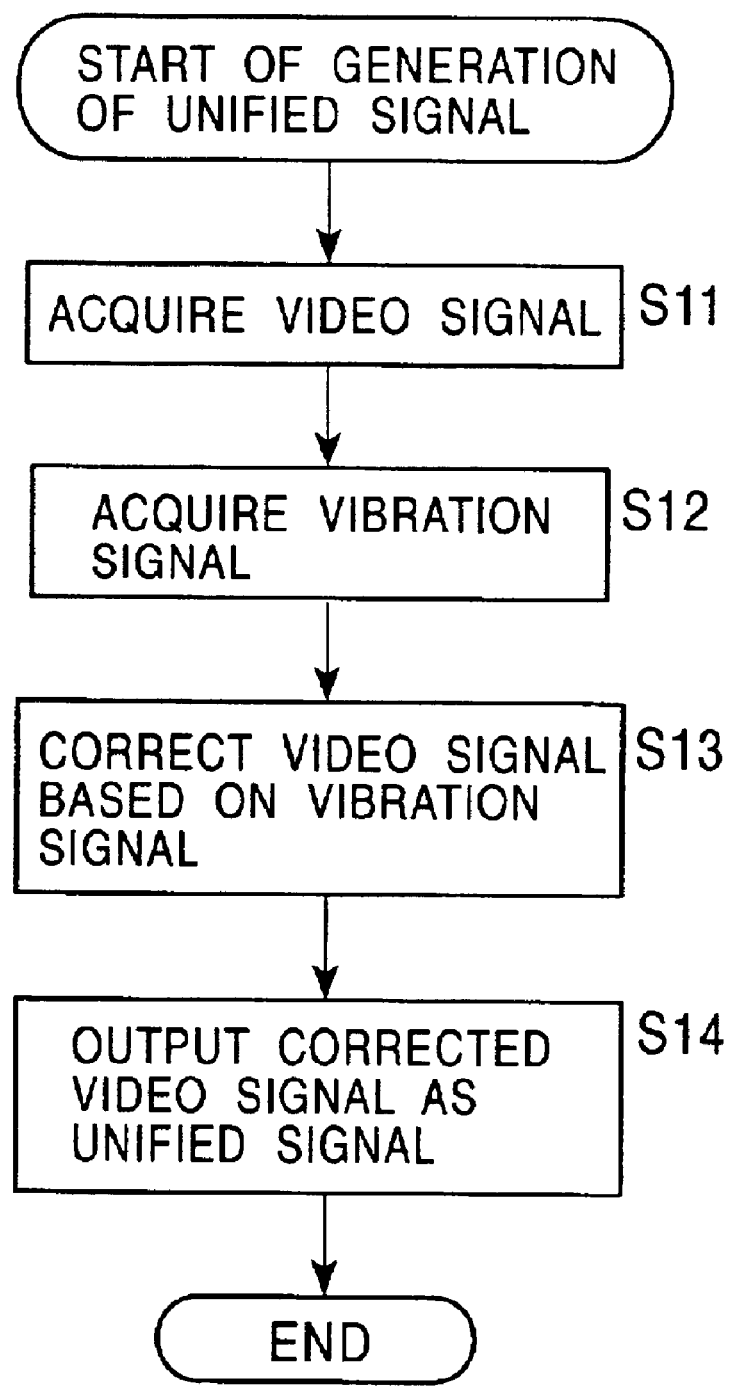
FIG. 18 is a flow diagram showing a generation process of a unified signal.

The generation process of the unified signal of the unified signal generator 1 will now be discussed, referring to a flow diagram shown in FIG. 18. In step S11, the unified signal encoder 13 retrieves a video signal prerecorded in the video signal recorder 11. In step S12, the unified signal encoder 13 retrieves a vibration signal prerecorded in the vibration signal recorder 12. The vibration signal corresponds to the video signal retrieved in step S11. The sequence order of steps S11 and S12 may be reversed.

In step S13, the unified signal encoder 13 corrects the video signal in response to the vibration signal. When the vibration signal is vertically shifted with respect to the image, the video signal is corrected so that the display position of the image is vertically shifted. The corrected video signal is fed to the unified signal transmitter 14 as the unified signal.

In step S14, the unified signal transmitter 14 outputs the corrected video signal as the unified signal, and ends the process. For example, the unified signal transmitter 14 outputs the unified signal to the unified signal reproducer 2 via a transmission line, such as a public telephone line, a network, or a satellite communications system.

Based on the video signal and the vibration signal, the unified signal generator 1 generates and outputs the unified signal.

Figure 19:
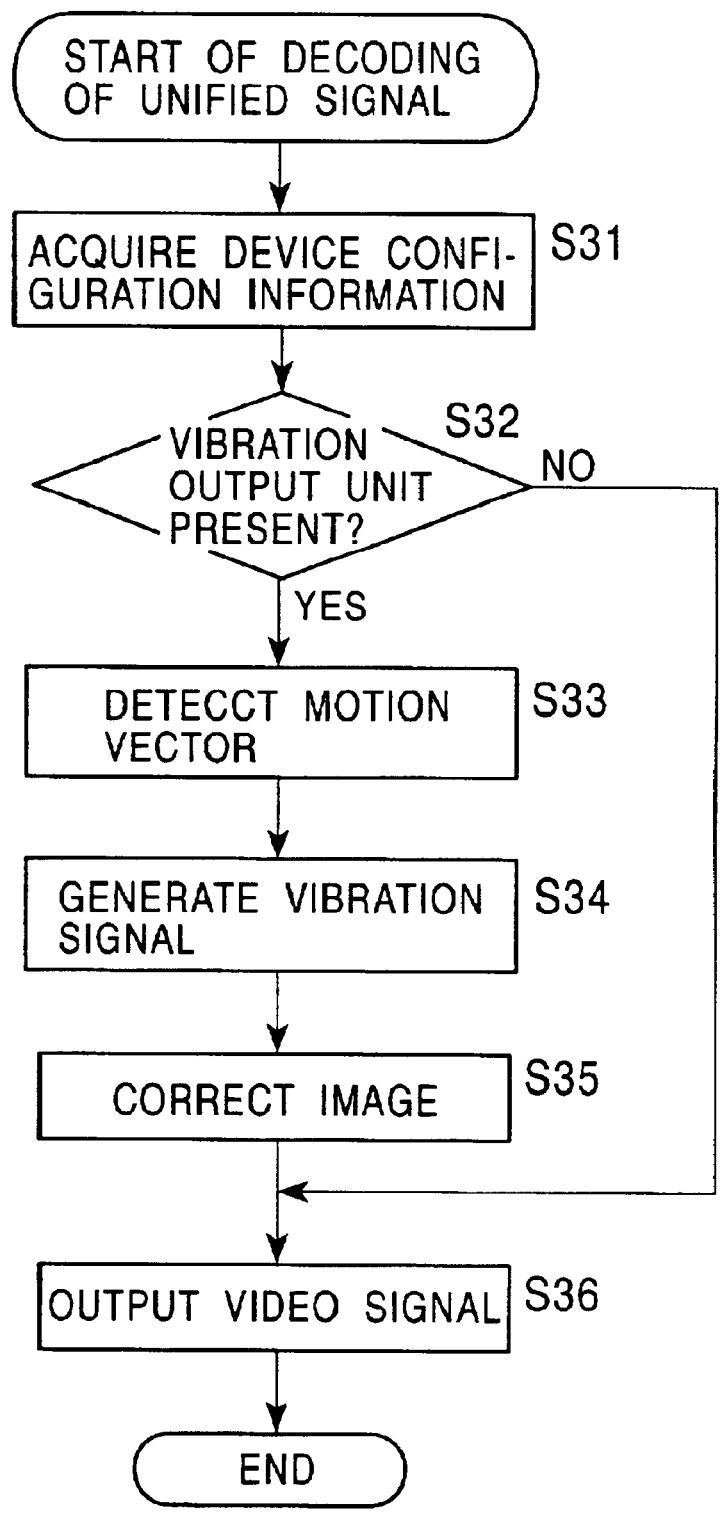
FIG. 19 is a flow diagram showing a decoding process of the unified signal.

Referring to a flow diagram shown in FIG. 19, the signal reproducing process of the unified signal reproducer 2 will now be discussed. In step S31, the parameter supplier 22 in the unified signal reproducer 2 acquires device configuration information supplied from the output device 3. The parameter supplier 22 generates a decode parameter responsive to the acquired device configuration information, and supplies the unified signal decoder 23 with the decode parameter.

In step S32, the unified signal decoder 23 determines from the decode parameter whether the output device 3 includes the vibration output unit 112. When it is determined that the output device 3 includes the vibration output unit 112, the process proceeds to step S33. In step S33, the motion vector detector 52 in the unified signal decoder 23 detects a motion vector from the unified signal from the unified signal receiver 21. The detected motion vector is fed to the vibration signal generator 54.

In step S34, the vibration signal generator 54 in the unified signal decoder 23 generates the vibration signal based on the motion vector. The generated vibration signal is output as the unified signal, while being fed to the image corrector 53 at the same time.

In step S35, the image corrector 53 in the unified signal decoder 23 corrects the image in response to the unified signal, thereby removing the vibration, based on the vibration signal. The video signal containing the corrected image is fed to the video signal selector 55. The process proceeds to step S36.

In step S36, the video signal selector 55 in the unified signal decoder 23 selects the video signal supplied from the image corrector 53 based on a signal supplied from the process decision unit 51, when the output device 3 includes the vibration output unit 112. The video signal selector 55 outputs the selected video signal as the presentation signal, and the process ends.

When it is determined in step S32 that the output device 3 includes no vibration output unit 112, there is neither need for generating the vibration signal nor for correcting the image. Steps in steps S33 and S35 are skipped, and the process proceeds to step S36.

In step S36, the video signal selector 55 in the unified signal decoder 23 selects the unified signal supplied from the process decision unit 51 based on a signal supplied from the process decision unit 51 when the output device 3 includes no vibration output unit 112. The video signal selector 55 outputs the selected video signal as the presentation signal. The process ends.

Based on the device configuration information supplied from the output device 3, the unified signal reproducer 2 outputs the vibration signal and the corrected image to the output device 3 when the output device 3 includes the vibration output unit 112. When the output device 3 includes no vibration output unit 112, the unified signal reproducer 2 outputs the unified signal as the presentation signal to the output device 3.

A second embodiment of the unified image presentation system of the present invention will now be discussed.

Figure 20:
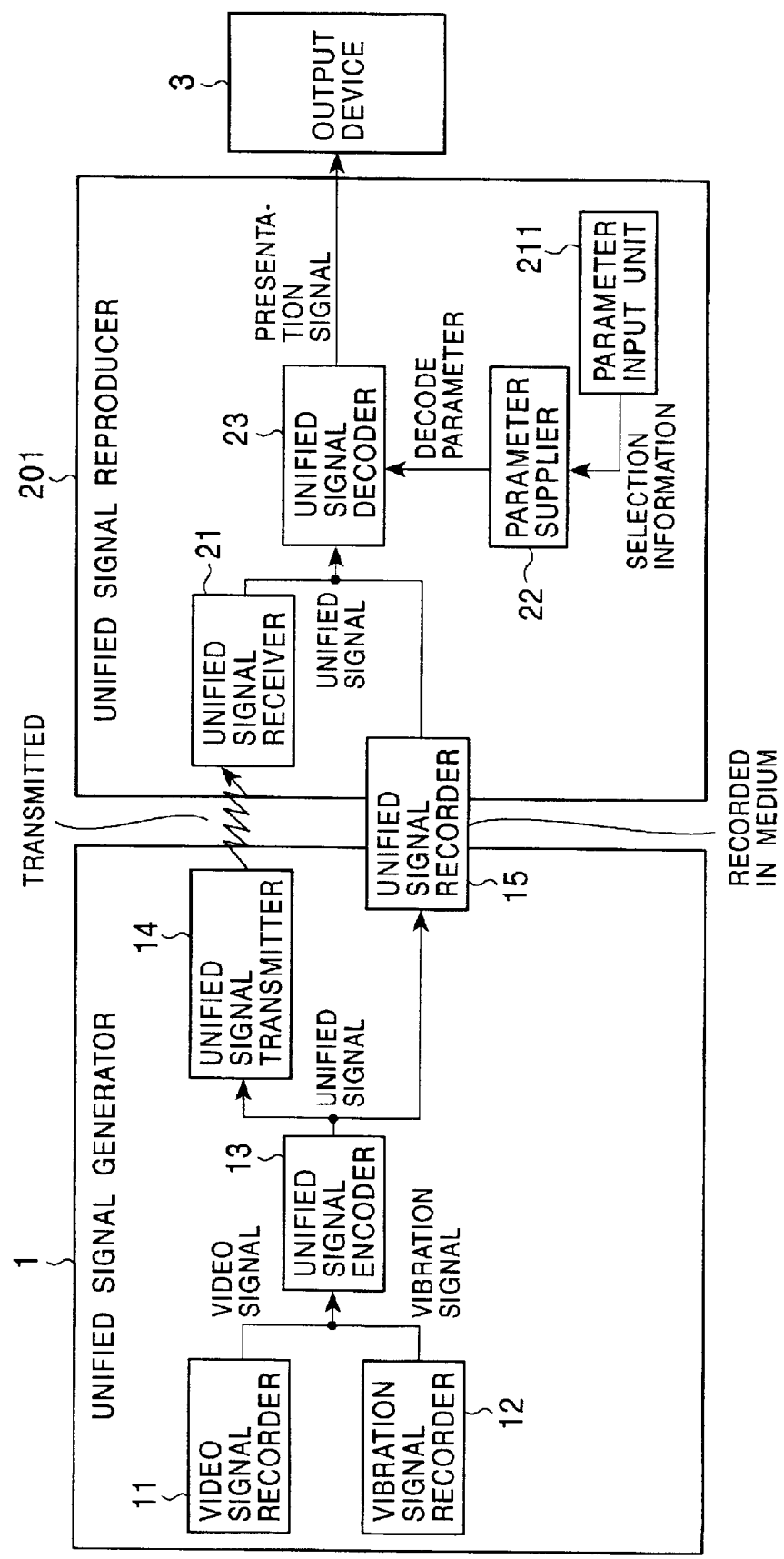
FIG. 20 is a block diagram showing a second embodiment of the unified signal presentation system of the present invention.

FIG. 20 shows the construction of the second embodiment of the unified signal presentation system of the present invention. As shown, components identical to those described with reference to FIG. 1 are designated with the same reference numerals, and the discussion thereof is skipped here.

A unified signal reproducer 201 includes a unified signal receiver 21, a parameter supplier 22, and a parameter input unit 211.

The parameter input unit 211, composed of a switch, and a selection information output circuit, outputs, to the parameter supplier 22, selection information responsive to the operation of the switch by the user.

When the parameter input unit 211 is operated to cause the unified signal reproducer 201 to output the video signal for the image containing vibration shown in FIG. 17, the parameter input unit 211 feeds, to the parameter supplier 22, selection information for outputting the video signal for the image containing vibration.

The parameter supplier 22 feeds, to the unified signal decoder 23, the decode parameter for outputting the unified signal as the video signal.

For example, the output device 3 now includes the video output unit 111 and the vibration output unit 112. When the parameter input unit 211 is operated to cause the unified signal reproducer 201 to output the presentation signal composed of the video signal and the vibration signal, the parameter input unit 211 feeds, to the parameter supplier 22, selection signal to output the presentation signal composed of the video signal and the vibration signal.

The parameter supplier 22 feeds, to the unified signal decoder 23, a decode parameter to output the video signal and the vibration signal as the unified signal.

Specifically, in response to the operation of the parameter input unit 211, the unified signal reproducer 201 outputs either the unified signal composed of the video signal and the vibration signal shown in FIG. 16 or the unified signal composed of the video signal only shown in FIG. 17.

Even when user of the unified signal reproducer 201 receives the same unified signal, the user is free to select between feeling vibration responsive to the actual vibration stimulus and visibly observing vibration on the vibrating image.

A third embodiment of the unified signal presentation system of the present invention will now be discussed.

Figure 21:
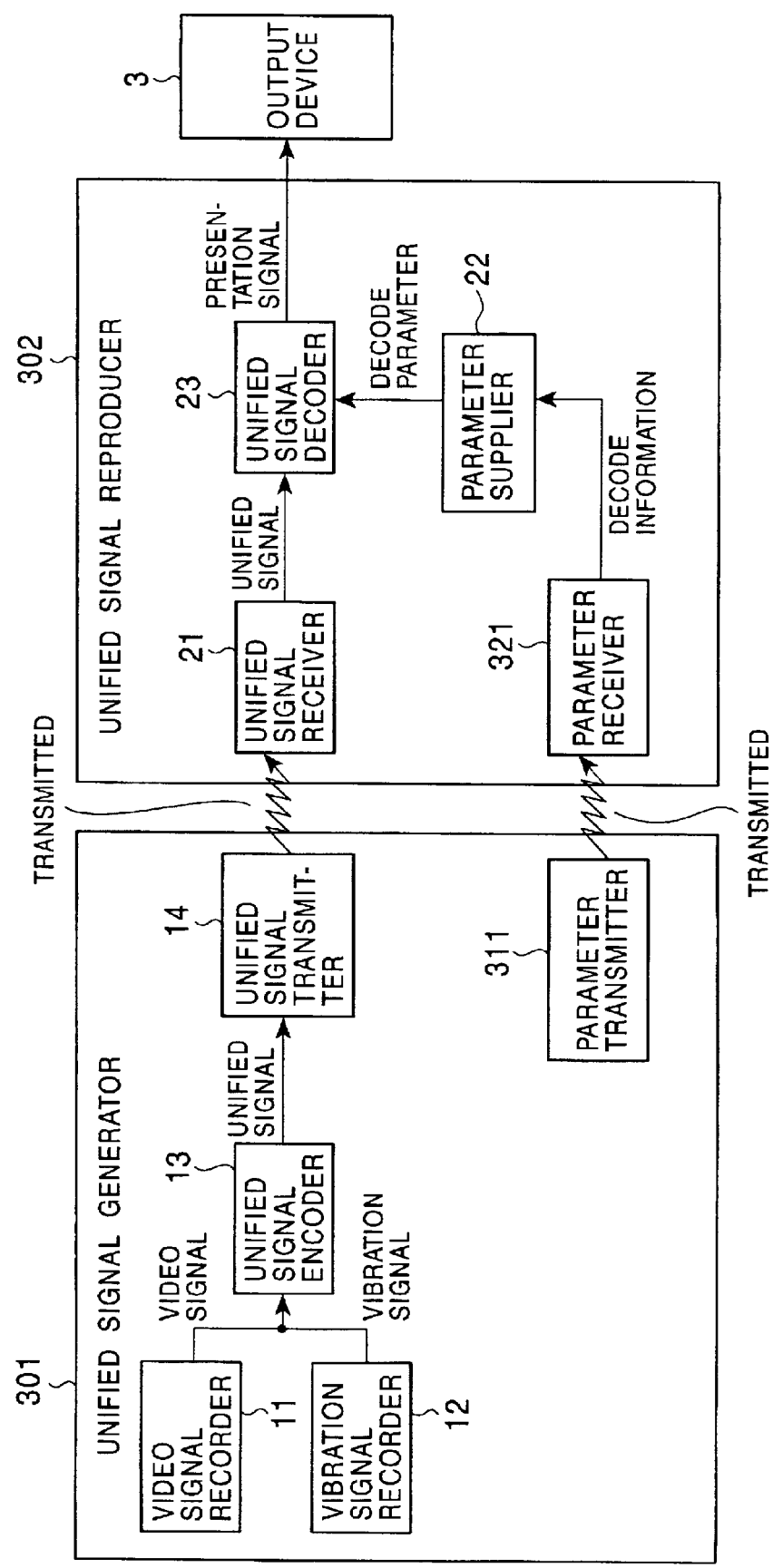
FIG. 21 is a block diagram showing a third embodiment of the unified signal presentation system of the present invention.

FIG. 21 shows the construction of a third embodiment of the unified presentation system of the present invention. As shown, components identical to those described with reference to FIG. 1 are designated with the same reference numerals, and the discussion thereof is skipped here.

A unified signal generator 301 includes a video signal recorder 11, a vibration signal recorder 12, a unified signal encoder 13, a unified signal transmitter 14, and a parameter transmitter 311.

The parameter transmitter 311 generates decode instruction information responsive to the unified signal, and then feeds the decode instruction information to a unified signal reproducer 302 via a transmission line, such as a public telephone line, a network, or a satellite communications system.

The unified signal reproducer 302 includes a unified signal receiver 21, a parameter supplier 22, a unified signal decoder 23, and a parameter receiver 321.

The parameter receiver 321 receives the transmitted decode instruction information from the unified signal generator 301 through the transmission line, and feeds the received decode instruction information to the parameter supplier 22.

Based on the received parameter instruction information from the parameter receiver 321, the parameter supplier 22 controls the unified signal decoder 23, thereby allowing the unified signal decoder 23 to output either the unified signal composed of the video signal and the vibration signal or the unified signal composed of the video signal only.

Under the control of the unified signal generator 301, the unified signal reproducer 302 selects between the unified signal composed of the video signal and the vibration signal and the unified signal composed of the video signal only.

In this way, the unified signal generator 301 controls the unified signal reproducer 302, thereby causing the unified signal reproducer 302 to select between the types of the unified signals. A broadcaster managing the unified signal generator 301 can select between two modes, depending on an image scene or the content of the image: in one mode, the user of the unified signal reproducer 201 is allowed to feel the vibration through the actual vibration stimulus and in the other mode, the user visibly observes the vibration through the vibration of the image.

The unified presentation system is not limited to sensory stimuli such as the image and vibration. The unified presentation system may generate a unified signal which indicate by a single signal a plurality of sensory stimuli (recognized by the five senses of humans) of voice, wind, temperature, scent, pressure (applied on the skin of the user), a shape (felt by tactile sense), etc. Based on the unified signal, the plurality of sensory stimuli of image, voice, wind, scent, pressure and shape may be presented to the user.

The output device 3, for instance, displays an image on a liquid-crystal display device or a CRT, and outputs sound on a loudspeaker.

The output device 3 may receive a presentation signal representing wind and temperature, which is generated based on a unified signal which may be an audio signal containing the howl of wind, the sound effect representing the hot scorching sun, or the sound effect of a cold wintry wind. The output device 3 generates wind using a blowing fan, warms a particular part of the user (hands, for example) using a heater device, or cools a particular part of the user using a cooling device.

The output device 3 may receive a presentation signal which is generated based on a unified signal as a video signal which contains an image suggesting a particular scent (such as the image of a fragrant olive, for example). A plurality of bottles which contain respective scents are prepared, and the output device 3 heats one bottom which contains the particular scent (of the fragrant olive, for example), thereby creating the scent responsive to the presentation signal.

The output device 3, equipped with a glove containing a plurality of actuators, presses a particular area of the hand of the user in accordance with the presentation signal responsive to the shape of an object (a round column, for example) represented in an image displayed in response to the unified signal. In this way, the output device 3 lets the user feel pressure or the shape (the round column, in this case).

A series of the above-referenced processes are performed by hardware in the above embodiments. Alternatively, the series of the above-referenced processes may be performed using a software program. When the processes are performed using a software program, a program code forming the software program may be installed in a computer assembled into a dedicated hardware, or a program code forming the software program may be installed from a recording medium to a general-purpose personal computer which performs a variety of functions when a diversity of software programs are installed.

Figure 22:
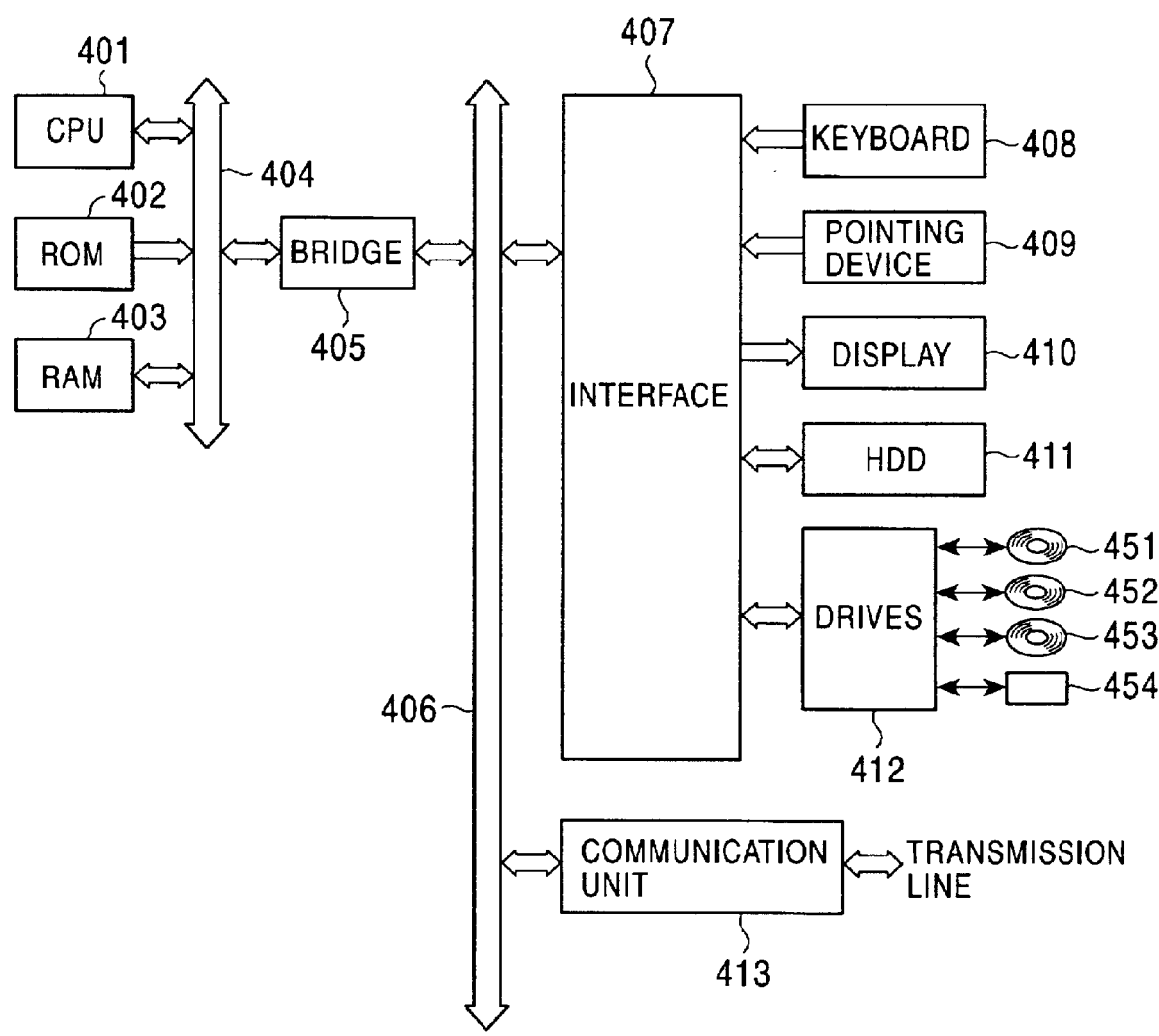
FIG. 22 is a block diagram showing a personal computer.

FIG. 22 shows a personal computer which performs the above-referenced series of processes. A CPU (Central Processing Apparatus) 401 performs an OS (Operating System) and an application program for carrying out the processes already discussed with reference to the flow diagram shown in FIG. 18 and FIG. 19. An ROM (Read-Only Memory) 402 stores a program carried out by the CPU 401 and essentially constant data out of process parameters. An RAM (Random Access Memory) 403 stores a program used by the CPU 401, and parameters varying in the execution of the program. These components are mutually interconnected through a host bus 404 including a CPU bus.

The host bus 404 is connected to an external bus 406 such as a PCI (Peripheral Component Interconnect/Interface) bus through a bridge 405.

A keyboard 408 is operated by the user when a variety of commands are input to the CPU 401. A pointing device 409 may be a mouse, a track ball, or a digitizer. The user operates the pointing device 409 to point to or select a location on the screen of a display 410. The display 410 may be a liquid-crystal device or a CRT device, and displays various pieces of information, texts, and images. An HDD (Hard Disk Drive) 411 drives a hard disk, and stores and reproduces data and the program to be executed by the CPU 401.

A drive 412 reads data and programs stored in a magnetic disk 451, an optical disk 452, a magneto-optical disk 453, and a semiconductor memory 454, and feeds the data and programs to the RAM 403 through an interface 407, the external bus 406, the bridge 405, and the host bus 404. The keyboard 408 through the drive 412 are connected to the interface 407, and the interface 407, in turn, is connected to the CPU 401 through the external bus 406, the bridge 405, and the host bus 404.

A communication unit 413, composed of an NIC (Network Interface Card), is connected to the transmission line, such as a public telephone line, a network, or a satellite communications system. The communication unit 413 stores the data supplied from the CPU 401 or the HDD 411 in a packet of a predetermined format, and then transmits the data over the transmission line, while outputting the data in a received packet to the CPU 401, the RAM 403, or the HDD 411.

The communication unit 413 is connected to the CPU 401, through the external bus 406, the bridge 405, and the host bus 404.

A recording medium storing the program for a series of processes may be formed of package media such as the magnetic disk 451 (including a floppy disk), the optical disk 452 (including a CD-ROM (Compact Disk Read Only Memory or a DVD (Digital Versatile Disk)) 452, the magneto-optical disk 453 (including an MD (Mini-Disk)) or the semiconductor memory 454 as shown in FIG. 22. The package media with the program stored therewithin may be distributed to the user, separately from the computer. The recording medium may also be the program loaded ROM 402 or HDD 411 which is incorporated in a computer and the computer is supplied to the user.

The steps of the program stored in the recording medium are chronologically performed in the sequence order as discussed above. Alternatively, steps of the program may be performed individually or may be performed in parallel at a time.

In the specification of the present invention, a system refers to an entire system composed of a plurality of apparatuses.

In accordance with the present invention, the first input unit inputs the first data representing the first sensing, the second input unit inputs the second data representing the second sensing, and the unified data is generated by unifying the first data and the second data. The unified signal containing a plurality of sensory stimuli is thus transmitted.

In accordance with the present invention, the unified signal corresponding to the first sensory stimulus and the second sensory stimulus is acquired, a decision is made of whether to generate a first signal responsive to the first sensory stimulus and a second signal responsive to the second sensory stimulus, the first and second signals are generated based on the unified signal when it is decided that the first and second signals are generated, and the first signal is output as the unified signal when it is decided that the first and second signals are not generated. Different sensory stimuli are presented in an appropriate manner in response to the presentation function of the stimuli.

What is claimed is:

1. A signal processing apparatus comprising:
   input means for inputting unified data including information of first sensing and second sensing; and
   generating means for generating first data representing the first sensing and second data representing the second sensing from the unified data,
   wherein said generating means comprises:
   first producing means for producing the first data representing first sensing based on the unified data; and
   second producing means for producing the second data representing second sensing based on the unified data,
   wherein said second producing means produces the second data representing second sensing based on the unified data and the first data that represents first sensing.

2. The signal processing apparatus according to claim 1, further comprising presentation means for presenting at least one of the first data, the second data, and the unified data.

3. The signal processing apparatus according to claim 1, wherein the first data represents vibration, and the second data represents an image.

4. The signal processing apparatus according to claim 1, wherein said first producing means comprises:
   motion-detecting means for detecting motion in the image of the unified data, and
   vibration-data producing means for producing data representing vibration based on the motion.

5. The signal processing apparatus according to claim 4, wherein the vibration includes at least one of pitching, rolling, and yawing.

6. A signal processing apparatus comprising:
   input means for inputting unified data including information of first sensing and second sensing; and
   generating means for generating first data representing the first sensing and second data representing the second sensing from the unified data,
   wherein said generating means comprises:
   first producing means for producing the first data representing first sensing based on the unified data; and
   second producing means for producing the second data representing second sensing based on the unified data,
   wherein said second producing means produces data representing the image by shifting the unified data based on the vibration-representing data.

7. The signal processing apparatus according to claim 6, wherein said second producing means comprises a means for shifting the image in accordance with motion and a means for producing data representing the image which is the shifted unified data.

8. The signal processing apparatus according to claim 4, wherein said second producing means produces data representing the image by shifting the unified data in accordance with motion.

9. The signal processing apparatus according to claim 1, further comprising:
deciding means for deciding to generate the first data and the second data, and
output means far outputting data which is the unified data or a set of the first data and the second data.

10. The signal processing apparatus according to claim 9, further comprising parameter input means for inputting a parameter for decision at said deciding means.

11. The signal processing apparatus according to claim 10, wherein said deciding means decides to generate the first data and the second data based on the parameter from said parameter input means.

12. The signal processing apparatus according to claim 10, wherein said parameter input means inputs the parameter in response to a signal from a presentation device.

13. The signal processing apparatus according to claim 10, wherein said parameter input means inputs the parameter in response to a signal input from outside.

14. The signal processing apparatus according to claim 10, wherein said parameter input means inputs the parameter in response to a signal from a signal processing apparatus which generates the unified data.

15. The signal processing apparatus according to claim 4, wherein said vibration-data producing means produces data representing vibration based on motion in accordance with a preset numerical formula.

16. A signal processing system comprising:
a first signal processing apparatus including;
first input means for inputting first data representing first sensing;
second input means for inputting second data representing second sensing; and
generating means for generating unified data by unifying the first data and the second data; and
a second signal processing apparatus including:
input means for inputting unified data including the information of first sensing and second sensing; and
generating means for generating first data representing the first sensing and second data representing the second sensing from the unified data,
wherein said generating means comprises:
first producing means for producing the first data representing first sensing based on the unified data; and
second producing means for producing the second data representing second sensing based on the unified data,
wherein said second producing means produces the second data representing second sensing based on the unified data and the first data that represents first sensing.

17. A signal processing method comprising the steps of:
inputting unified data including information of first sensing and second sensing; and
generating first data representing the first sensing and second data representing the second sensing from the unified data,
wherein said generating step comprises:
a first producing step far producing the first data representing first sensing based on the unified data; and
a second producing step for producing the second data representing second sensing based on the unified data,
wherein said second producing step produces the second data representing second sensing based on the first data that represents first sensing, and the unified data.

18. The signal processing method according to claim 17, further comprising presenting at least one of the first data, the second data, and the unified data.

19. The signal processing method according to claim 17, wherein the first data represents vibration, and the second data represents an image.

20. The signal processing method according to claim 17, wherein said first producing step comprises:
detecting motion in the image of the unified data, and producing data representing vibration based on the motion,
wherein the vibration includes at least one of pitching, rolling, and yawing motions.

21. A signal processing method comprising the steps of:
inputting unified data including information of first sensing and second sensing; and
generating first data representing the first sensing and second data representing the second sensing from the unified data,
wherein said generating step comprises:
a first producing step for producing the first data representing first sensing based on the unified data; and
a second producing step for producing the second data representing second sensing based on the unified data,
wherein said second producing step produces data representing the image by shifting the unified data based on the vibration-representing data.

22. The signal processing method according to claim 17, further comprising the steps of:
deciding to generate the first data and the second data, and
outputting data which is the unified data or a set of the first data and the second data.

23. A signal processing method comprising:
a first signal processing method including the steps of:
inputting first data representing first sensing;
inputting second data representing second sensing, and generating unified data by unifying the first data and the second data; and
a second signal processing method including the step of:
inputting unified data including the information of first sensing and second sensing; and
generating first data representing the first sensing and second data representing the second sensing from the unified data,
said generating step comprising:
a first producing step for producing the first data representing first sensing based on the unified data; and
a second producing step for producing the second data representing second sensing based on the unified data,
wherein said second producing step produces the second data representing second sensing based on the first data that represents first sensing, and the unified data.

24. A computer-readable storage medium storing a software program, the program comprising:
program code for inputting unified data including information of first sensing and second sensing; and program code for generating first data representing the first sensing and second data representing the second sensing from the unified data, said program code for generating first data comprising:

program code for producing the first data representing first sensing based on the unified data; and program code for producing the second data representing second sensing based on the unified data, wherein said program code for producing the second data produces the second data representing second sensing based on the first data that represents first sensing, and the unified data.

25. A computer-readable storage medium storing a software program, the program comprising:

a first program including:

program code for inputting first data representing first sensing, program code for inputting second data representing second sensing, and program code for generating unified data by unifying the first and the second data; and a second program including:

program code for inputting unified data including the information of first sensing and second sensing, and program code for generating first data representing the first sensing and second data representing the second sensing from the unified data, wherein said program code for generating first data and second data comprises:

program code for producing the first data representing first sensing based on the unified data; and program code for producing the second data representing second sensing based on the unified data, wherein said program code for producing the second data produces the second data representing second sensing based on the first data that represents first sensing, and the unified data.

26. The signal producing apparatus according to claim 6, wherein the first data represents vibration, and the second data represents an image.

27. A computer-readable storage medium storing a software program, the software program comprising:

program code for inputting unified data including information of first sensing and second sensing; and program code for generating first data representing the first sensing and second data representing the second sensing from the unified data, wherein said program code for generating first data comprises:

program code for producing the first data representing first sensing based on the unified data; and program code for producing the second data representing second sensing based on the unified data, wherein said program code for producing the second data produces data representing the image by shifting the unified data based on the vibration-representing data.

* * * * *